(12) United States Patent
Wang

(10) Patent No.: US 8,320,463 B2
(45) Date of Patent: *Nov. 27, 2012

(54) REFERENCE DATA BUFFER FOR INTRA-PREDICTION OF DIGITAL VIDEO

(75) Inventor: Wen-Shan Wang, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 12/685,839

(22) Filed: Jan. 12, 2010

(65) Prior Publication Data

US 2010/0111175 A1 May 6, 2010

Related U.S. Application Data

(63) Continuation of application No. 11/097,890, filed on Mar. 31, 2005, now Pat. No. 7,684,491.

(51) Int. Cl.
*H04N 7/12* (2006.01)
(52) U.S. Cl. .............................. 375/240.24; 375/240.01
(58) Field of Classification Search .................. 375/240, 375/240.01, 240.12, 240.24, 240.28; 345/545
See application file for complete search history.

(56) References Cited

U.S. PATENT DOCUMENTS 6,324,217 B1 * 11/2001 Gordon .................... 375/240.28
6,462,744 B1    10/2002 Mochida et al.
6,614,442 B1 *  9/2003 Ouyang et al. ................ 345/545

OTHER PUBLICATIONS

Intel Corp., Non Final Office action mailed Apr. 1, 2009; U.S. Appl. No. 11/097,890.
Intel Corp., Final Office action mailed Sep. 28, 2009; U.S. Appl. No. 11/097,890.

* cited by examiner

*Primary Examiner* — Allen Wong
(74) *Attorney, Agent, or Firm* — Blakely, Sokoloff, Taylor & Zafman LLP

(57) ABSTRACT

Encoding or decoding digital video frames in intra-prediction mode by selecting column reference data locations for blocks adjacent a current block from a column reference data buffer storing column reference data samples for no more than two macro blocks of the frame. In some cases, the column reference data buffer may include a storage size for samples of a first column of data of blocks of one macro block of luminance samples. Encoding and decoding may also include selecting row reference data locations for blocks adjacent a current block from a row reference data buffer storing row reference data samples for at least one row of macro blocks of the frame. In some cases, the row reference data buffer may include storage for samples of a first row of data of fourteen successive blocks spanning two rows. The concept can be applied to various video processing components and standards.

11 Claims, 11 Drawing Sheets

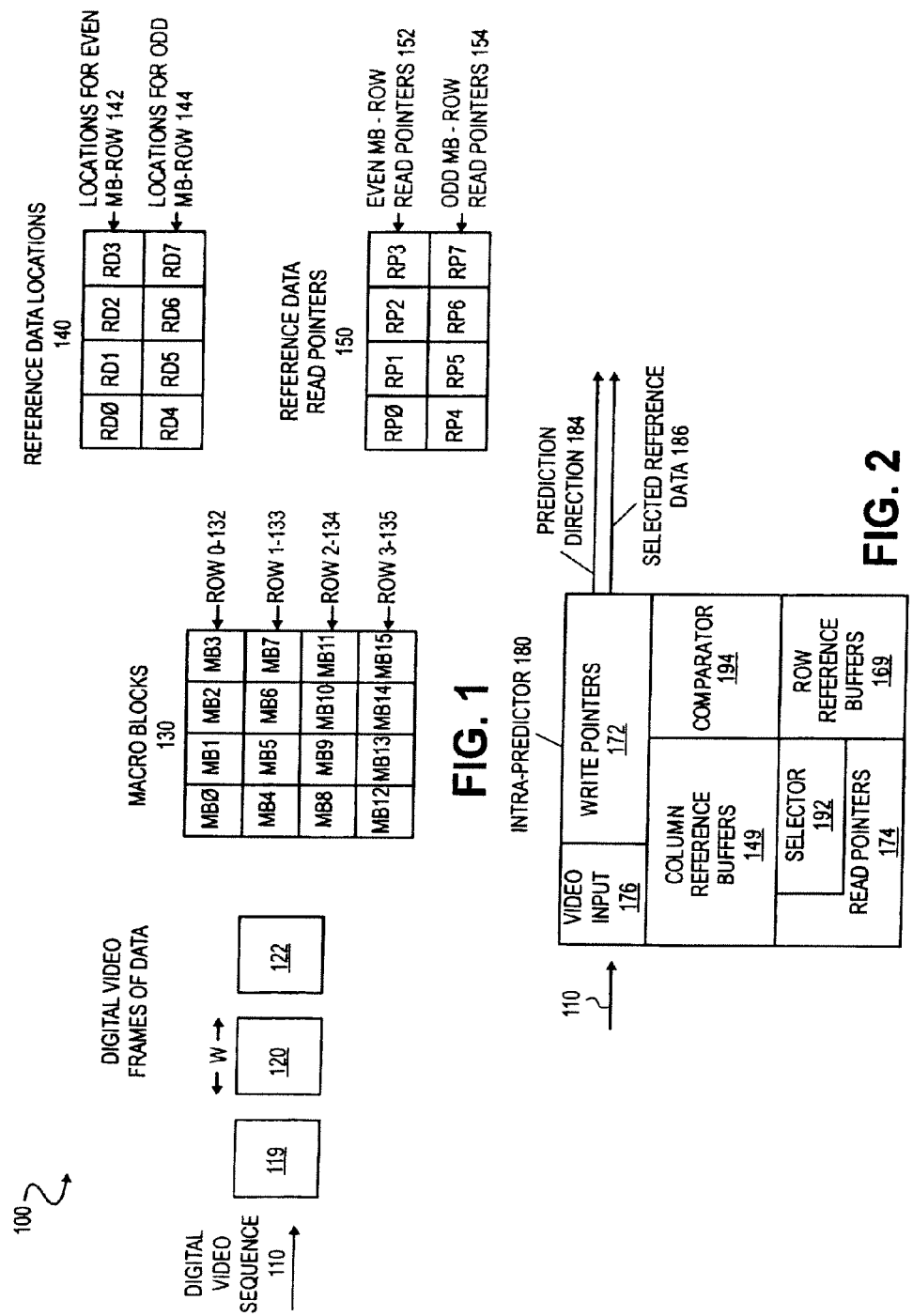

| | 0 | 1 | 2 | 3 | 4 | 5 | 6 | 7 | ← COL |
|---|---|---|---|---|---|---|---|---|---|
| 0 | C0 R0 | C1 R0 | C2 R0 | C3 R0 | C4 R0 | C5 R0 | C6 R0 | C7 R0 | |
| 1 | C0 R1 | C1 R1 | | | | | | | |
| 2 | C0 R2 | | | | C4 R2 | | | | 400 |
| 3 | C0 R3 | | | | | | | | |
| 4 | C0 R4 | | | | | | | | |
| 5 | C0 R5 | | | | | | | | |
| 6 | C0 R6 | | C2 R6 | | | | | | |
| 7 | C0 R7 | | | | | | | C7 R7 | |

↑ ROW

|  | MB0,8 | MB1,9 | MB2,10 | MB3,11 | |
|---|---|---|---|---|---|
| EVEN ROW - 612 | 0 Y0:Y1 16 / 32 Y2:Y3 48 | 64 Y0:Y1 80 / 96 Y2:Y3 112 | 128 Y0:Y1 144 / 160 Y2:Y3 176 | 192 Y0:Y1 208 / 224 Y2:Y3 240 | |
| ODD ROW - 614 | 256 Y0:Y1 272 / 288 Y2:Y3 304 | 320 Y0:Y1 336 / 352 Y2:Y3 368 | 384 Y0:Y1 400 / 416 Y2:Y3 432 | 448 Y0:Y1 464 / 480 Y2:Y3 496 | |
|  | MB4,12 | MB5,13 | MB6,14 | MB7,15 | |

310

|  | 0 | 8 | 16 | 24 | 32 | 40 | 48 | 56 |
|---|---|---|---|---|---|---|---|---|
| MB0/8 | Row Ref. | :Column Ref. | Row Ref. | :Column Ref. | Row Ref. | :Column Ref. | Row Ref. | :Column Ref. |
|  | Y0 | | Y1 | | Y2 | | Y3 | |
|  | 64 | 72 | 80 | 88 | 96 | 104 | 112 | 120 |
| MB1/9 | Row Ref. | :Column Ref. | Row Ref. | :Column Ref. | Row Ref. | :Column Ref. | Row Ref. | :Column Ref. |
|  | Y0 | | Y1 | | Y2 | | Y3 | |
|  | 128 | 136 | 144 | 152 | 160 | 168 | 176 | 184 |
| MB2/10 | Row Ref. | :Column Ref. | Row Ref. | :Column Ref. | Row Ref. | :Column Ref. | Row Ref. | :Column Ref. |
|  | Y0 | | Y1 | | Y2 | | Y3 | |
|  | 448 | 456 | 464 | 472 | 480 | 488 | 496 | 504 |
| MB7/15 | Row Ref. | :Column Ref. | Row Ref. | :Column Ref. | Row Ref. | :Column Ref. | Row Ref. | :Column Ref. |
|  | Y0 | | Y1 | | Y2 | | Y3 | |

EVEN ROW - 812
ODD ROW - 814

| MB0,8 | MB1,9 | MB2,10 | MB3,11 |
|---|---|---|---|
| 0  Y0:Y1  8 / 16 Y2:Y3 24 | 32 Y0:Y1 40 / 48 Y2:Y3 56 | 64 Y0:Y1 72 / 80 Y2:Y3 88 | 96 Y0:Y1 104 / 112 Y2:Y3 120 |
| 128 Y0:Y1 136 / 144 Y2:Y3 152 | 160 Y0:Y1 168 / 176 Y2:Y3 184 | 192 Y0:Y1 200 / 208 Y2:Y3 216 | 224 Y0:Y1 232 / 240 Y2:Y3 248 |
| MB4,12 | MB5,13 | MB6,14 | MB7,15 |

FIG. 8B

REFERENCE DATA BUFFER FOR INTRA-PREDICTION OF DIGITAL VIDEO

CROSS REFERENCE TO RELATED APPLICATIONS

This application is a continuation of U.S. patent application Ser. No. 11/097,890 filed Mar. 31, 2005 entitled "REFERENCE DATA BUFFER FOR INTRA-PREDICTION OF DIGITAL VIDEO" issued as U.S. Pat. No. 7,684,491 on Mar. 23, 2010.

BACKGROUND

1. Field

The field generally relates to digital video encoding and decoding.

2. Background

Compressed or coded digital video is quickly becoming ubiquitous for video storage and communication. Generally speaking, video sequences contain a significant amount of statistical and subjective redundancy within and between frames. Thus, video compression and source coding provides the bit-rate reduction for storage and transmission of digital video data by exploiting both statistical and subjective redundancies, and to encode a "reduced set" of information using entropy coding techniques. This usually results in a compression of the coded video data compared to the original source data. The performance of video compression techniques depends on the amount of redundancy contained in the image data as well as on the actual compression techniques used for coding. For example, video compression or coding algorithms are being used to compress digital video for a wide variety of applications, including video delivery over the Internet, digital television (TV) broadcasting, satellite digital television, digital video disks (DVD), DVD players, set top boxes, TV enabled personal computers (PC), as well as video storage and editing.

Current compression algorithms can reduce raw video data rates by factors of 15 to 80 times without considerable loss in reconstructed video quality. The basic statistical property upon which some compression techniques rely is inter-pel correlation. Since video sequences usually contain statistical redundancies in both temporal and spatial directions, it is assumed that the magnitude of a particular image pel can be predicted from nearby pixels within the same frame (using intra-frame coding techniques) or from pixels of a nearby frame (using inter-frame techniques). In some circumstances, such as during scene changes of a video sequence, the temporal correlation between pixels of nearby frames is small (e.g., the video scene is then, an assembly over time of uncorrelated still images). In such cases, intra-frame coding techniques are appropriate to explore spatial correlation to achieve sufficient data compression.

To achieve intra-frame coding, various compression processes employ discrete cosine transform (DCT) coding techniques on image blocks of 8×8 pixels to effectively explore spatial correlation between nearby pixels within the same image. For example, these processes typically encode a "current" 8×8 block by reading previously saved reference data for surrounding "reform" 8×8 blocks to determine a prediction direction (e.g., direction determination) and to perform predicting (e.g., intra-prediction or intra-prediction coding). Additionally, after finishing intra-prediction coding of the current block, these processes typically include saving part of a reconstructed version of the current block to a data buffer as reference data for later prediction use (e.g., such as saving a first row and first column or last row and last column of the reconstructed version of the current block).

BRIEF DESCRIPTION OF THE DRAWINGS

Various features, aspects and advantages will become more thoroughly apparent from the following detailed description, the set of claims, and accompanying drawings in which:

FIG. 1 is a block diagram of digital video data for encoding or decoding.

FIG. 2 is a block diagram of an intra-predictor to encode or decode digital video data.

FIG. 4 shows row and column reference data of a block of data to store to a buffer.

FIG. 6 shows reference data locations for two rows of Y components.

FIG. 7 shows row and column reference data locations for two rows of Y components.

FIG. 8A shows row reference data locations for two rows of Y components.

FIG. 8B shows separate row reference data locations and column reference data locations for two rows of Y components.

DETAILED DESCRIPTION

Figure 3:
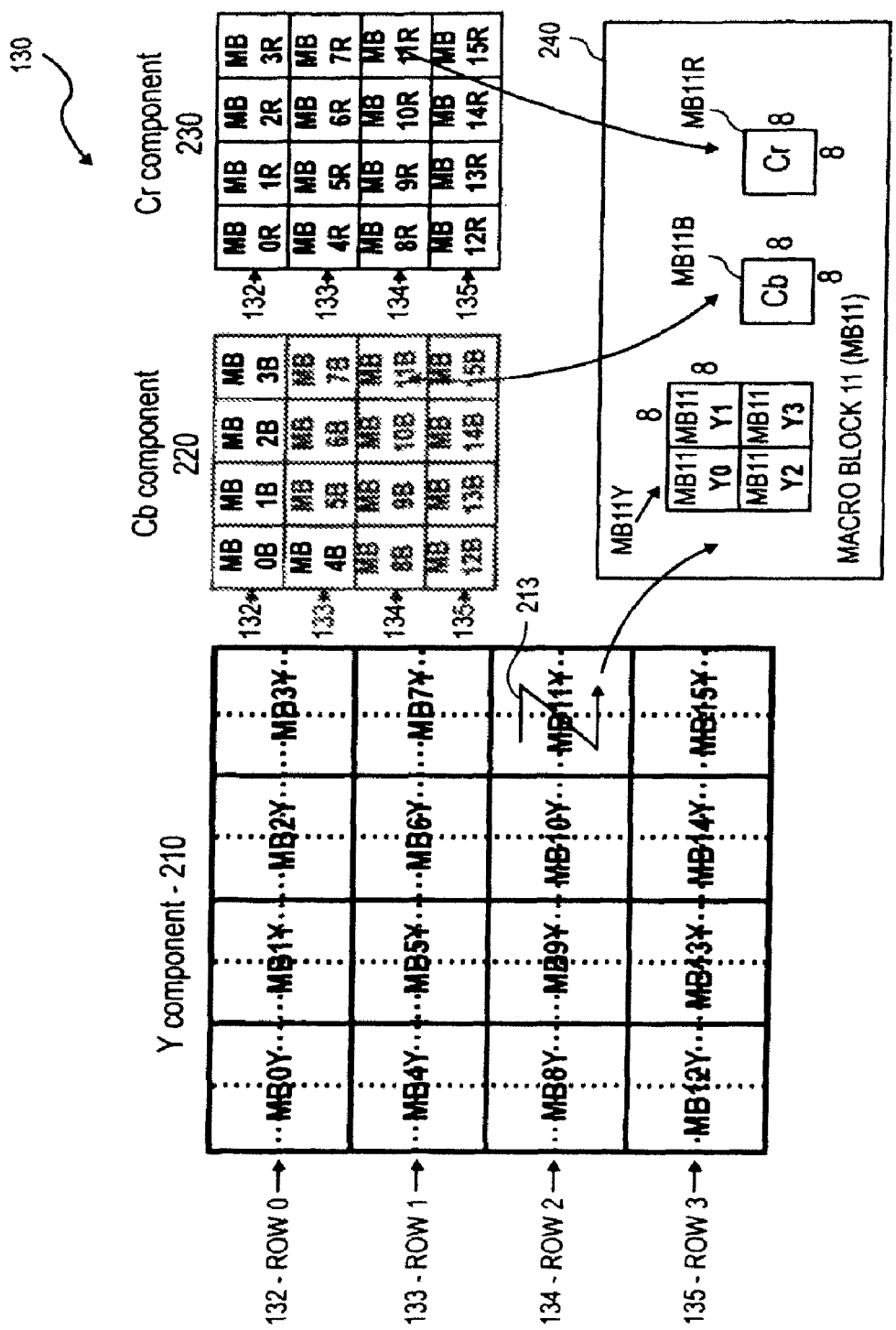
FIG. 3 shows macro blocks of digital video data.

FIG. 1 is a block diagram of digital video data for encoding and decoding. FIG. 1 shows system 100 such as an electronic system, a computing device, a computing system, a video system, a video encoder, a video decoder, video compressor, a video decompressor, a video converter to encode, decode, compress, or decompress a digital video sequence or stream of data according to a standard. For instance, system 100 may process, encode, or decode video according to a moving picture experts group (MPEG) standard (e.g., such as MPEG2 (ISO/IEC 13818-2:2000, published 2000) or MPEG4 (ISO/IEC 14496-3:2000, published 2004)). Note that encoding and/or decoding may be referred to as "coding". System 100 is shown receiving digital video sequence 110 such as a sequence of stream of pictures or frames of video data, such as raster scanned frames in temporal sequential order. Specifically, digital video frames of data 119, 120 and 122 represent consecutive frames or pictures of data.

System 100 may perform direction decision (e.g., direction determination) and intra prediction processes (e.g., intra-prediction or intra-prediction coding) of the encoding and/or decoding frame of data 120, such as by encoding or decoding intra-prediction blocks of the frame to refresh the temporal prediction of sequence 110 in an encoded (e.g., MPEG) version of the sequence. Thus, frame of data 120 may be encoded or decoded in intra-prediction mode independently of frames of data 119 and 122.

FIG. 1 also shows macro blocks 130 of a frame of digital data, such as including all or a portion of the macro blocks of frame of data 120 (e.g., intra-prediction blocks of the frame). Thus, macro blocks 130 may include macro blocks extending across all or a portion of width W of frame of data 120. Macro blocks 130 has four rows, row 0-132, row 1-133, row 2-134, and row 3-135. Thus, each or any of row 0-132 through row 3-135 may include samples extending width W. Specifically, macro blocks 130 include sixteen macro blocks (e.g., macro block MB0, MB1, . . . MB15) having samples of data or image information, such as pixels, levels, information, or data for color and/or luminance of frame of data 120. In some cases, samples may represent filtered, selected, sampled, or otherwise generated information from a data entity or a pixel of the frame including samples of color (e.g., blue chrominance samples (Cb) and/or red chrominance samples (Cr)) and/or brightness samples (e.g., luminance samples (Y)). More particularly, the combination of color samples and luminance samples for a given location, dated entity, or pixel stored in a location of a macro block may represent separately stored or buffered color and luminance samples that when combined represent the pixel of the image or frame of data.

Intra-prediction encoding or decoding macro blocks 130 may be performed by comparing samples of a current block (e.g., the block being encoded or decoded) with samples of a "reference block" selected from a number of blocks adjacent to the current block. Moreover, the reference block may be selected from a number of adjacent blocks to the current block so that the difference between sample of the current block and the reference block is minimal. Therefore, the minimal difference can be coded into less data to reconstruct the current block from the reference block. During such coding, the "direction" of the reference block can be identified (e.g., direction decision) to encode or decode the current block. Thus, direction decision can give the direction of the reference block for performing intra-predicting encoding and decoding. Reference data of the current and reference blocks stored and considered during coding may include some or all of the color and/or luminance samples of each macro block. In some cases, only one row or column of reference data is stored for a block (e.g., the first column of reference data from a reference data location to the left of a current block).

For example, FIG. 1 shows reference data locations 140 including rows of row and/or column reference data that may be used to encode and decode a current block of samples. Locations 140 include locations for the row and/or column reference data of even macro block row 142 and odd macro block row 144, such as locations for reference data of consecutive rows of macro blocks 130. Row 142 includes reference data locations RD0, RD1, RD2, and RD3 for row 0-132 of blocks 130 (e.g., MB0-MB3). Similarly, row 144 includes RD4, RD5, RD6, and RD7, for row 1-133 of blocks 130 (e.g., MB4-MB7).

Rows 0-132, 1-133, 2-134, and 3-135 may be "marco block (MB) rows" such as rows of macro blocks of macro blocks 130, where each MB row includes 2 rows of 8×8 Y blocks (e.g., one row includes Y0 and Y1 blocks while second row includes Y2 and Y3 blocks), one row of 8×8 Cr blocks, and one row of 8×8 Cr blocks. Thus, locations 140 (e.g., including row 142 and row 144) may be locations for the row and/or column reference data of 4 rows of 8×8 Y blocks, two rows of 8×8 Cb blocks, and two rows of 8×8 Cr blocks.

Moreover, row 142 and row 144 may correspond to locations for any consecutive even and odd MB row of blocks 130 where locations 140 are being overwritten during processing when the row and/or column reference data at their locations is no longer needed during encoding or decoding processing. Specifically, row 142 may correspond to row 2-134 of blocks 130 and row 144 may correspond to row 3-135 of blocks 130 after row 142 has been rewritten with row 2-134 during processing (e.g., and prior to row 144 being rewritten with row 3-135). Thus, each location of reference data locations 140 may correspond to, point to, identify, address, store or buffer or be a location in a buffer at which data, such as row and/or column reference data is stored.

FIG. 1 also shows reference data read pointers 150 to point to row and/or column reference data locations of reference data locations 140. Pointers 150 may point, select, identify, or direct to locations, addresses, memory, or other location identifiers (such as reference data locations 140) for data storage, repositories, buffers, or memories to store row and/or column reference data during direction determination and intra-prediction coding. Pointers 150 include even macro block row read pointers 152 including read pointers RP0, RP1, RP2, and RP3. Pointers 152 may be generated, pointed, or selected to when one or more write pointers point to row 142, such as where read pointer RP0 includes two or more read pointers to locations in locations 140, when a write pointer points to location RD0 (e.g., when location RD0 corresponds to the current block being encoded or decoded, such as when during encoding or decoding a write pointer points to block MB0 of blocks 130 to code intra-prediction direction and code for MB0). Similarly, pointers 150 include odd macro block row read pointers 154 having read pointers RP4, RP5, RP6, and RP7. Pointers 154 may also be generated, pointed, or selected to when one or more write pointers point to row 144, as described above with respect to pointers 152 and row 142, except that pointers 154 function when a writing pointer points to an odd macro block rows.

During processing, two or more of read pointers 152 and 154 may point to the reference data in both row 142 and row 144 when a write pointer points either row 142 or 144, such as when reading row and column reference data. For instance, pointers 150 may point to reference data for locations to the left, left above, above, and optionally right above a current block of a macro block to point to reference data of 4 rows of 8×8 Y blocks, two rows of 8×8 Cb blocks, and/or two rows of 8×8 Cr blocks.

FIG. 2 is a block diagram of an intra-predictor to encode or decode digital video data. FIG. 2 shows intra-predictor 180, such as an intra-predictor that is part of an encoder or decoder, such as by being all or part of system 100 of FIG. 1. Thus, intra-predictor 180 may process sequence 110 to produce prediction direction 184 and selected reference data 186. FIG. 2 shows intra-predictor 180 including video input 176, such as an input for receiving sequence 110 and frames of digital video therein. Video input 176 may be an electronic hardware input or source of video data such as a cable input, a television tuner output, a cable tuner output, a digital video disc player, a compact disc player, or a computer. Processes for producing selected reference data 186 and prediction direction 184 are known in the art. For instance, such processes may include a video encoder and a video decoder both having intra prediction processes but using opposite algorithms to create the selected reference data 186, even though they are using the same standard (e.g., an MPEG standard).

Furthermore, during direction decision or determination and intra-prediction, the row and/or column reference data (e.g., the data or samples at locations 140) may be stored in a memory or buffer where it can be overwritten during processing. For example, FIG. 2 shows intra-predictor 180 having column reference buffers 149 and row reference buffers 169 which may be buffer locations, buffer addresses, or buffers to store column and row reference data corresponding to locations of column and row reference data samples, such as samples stored for or at locations 140. Specifically, column reference buffers 149 and row reference buffers 169 may be data buffers, computer buffers or various types of computer memory (e.g., random access memory (RAM), double-rate random memory (DDR) or electrical erasable read only memory (EEPROM) or other electronic memory for storing reference data or samples addressed by, at, or corresponding to locations 140. Each buffer of column reference buffers 149 and row reference buffers 169 may store samples corresponding to, associated with, or for, a reference data location (e.g., a block or a macro block of a frame, such as data of one of blocks 130).

Also, it is considered that column reference buffers 149 may be one or more column reference data buffers and row reference buffers 169 may be one or more row reference data buffers. Accordingly, column reference buffers 149 and row reference buffers 169 may be one or more buffers located, pointed or addressed by a write and/or read pointer (e.g., where the write and/or read pointer points to a location or address of a current macro block of blocks 130 of FIG. 1 being intra-predicted).

It is also considered that column reference buffers 149, row reference buffers 169, and buffers thereof may be part of the same buffer (e.g., another buffer distinguished from the column reference data buffer by addressing, offset, base address, virtual address, etc. . . . ), a different buffer (e.g., another buffer in the same device, chip, board, or memory as the column reference data buffer), or a separate buffer (e.g., another buffer that is not part of the same buffer or chip as the column reference data buffer). Also, column reference buffers 149 and row reference buffers 169 may perform the functions described above for locations 140 of FIG. 1.

Intra-predictor 180 also includes write pointers 172 such as pointers to select, direct, point to, address or identify a current location, buffer, or block from more than one reference data locations, reference data buffers, reference data blocks, or reference data macro blocks to process, encode, decode, and/ or write data to (e.g., reference data for later use). For example, write pointers 172 may select one of blocks 130 or locations 140, as a "current block" or "current location" for which prediction direction 184 and selected reference data 186 are to be determined. In some cases, write pointers 172 may select one row reference data location and one column reference data location, such as by defining a column buffer write pointer and a separate row buffer write pointer to point to one or more column reference data buffers and one or more row reference data buffers. Here, the row reference data location may be selected by pointing to a location from blocks 130, locations 140, or a row reference data location or buffer of row reference buffers 169, as a current block or location to compare to or cause to be compared row reference data of an adjacent, abutting, above, above left, directly above, or above right location to the current location. Also, the column reference data location may be selected by pointing to a location from blocks 130, locations 140, or a column reference data location or buffer of column reference buffers 149, as a current block, buffer, or location to compare to or cause to be compared column reference data of an adjacent, abutting, or location to the left of the current location.

It is also considered that the pointed to row reference data location and column reference data location may be different locations, such as by being adjacent locations or otherwise not corresponding to the same location of blocks 130, or locations 140 at a point or period during processing.

In some cases, during processing, write pointers 172 will move or progress through macro blocks of blocks 130 and/or locations of locations 140 in "raster order". Raster order may be defined as an order sequencing from left to right along a row and then moving down on column, in an increasing column sequence, to progress through the next row from left to right. For example, raster order may progress through blocks 130 in the order of MB0, MB1, MB2, MB3, MB4, MB5, MB6, MB7, MB8 . . . MB15.

Intra-predictor 180 includes read pointers 174, such as pointers to select, direct, point to, address, consider or identify various data locations adjacent to, neighboring, or abutting the current location or block pointed to by a write pointer to read data from, such as during processing, encoding, decoding, and/or producing prediction direction 184 and selected reference data 186. Thus, during processing, read pointers 174 may point to one or more macro blocks of blocks 130 and/or locations of locations 140 adjacent or abutting a current block location pointed to by a write pointer.

In some cases, read pointers 174 may select one or more row reference data locations and one or more column reference data location, such as by defining column buffer read pointers and row buffer read pointers to point to one or more column reference data buffers and one or more row reference data buffers. Hence, row reference data locations may be selected by pointing to locations from blocks 130, locations 140, or a row reference data location or buffer of row reference buffers 169 that are adjacent, abutting, above, above left, directly above, and/or above right locations to the current location to compare with row data or samples of each other or of the current location. Also, the column reference data locations may be selected by pointing to a locations from blocks 130, locations 140, or a column reference data location or buffer of column reference buffers 149 that are adjacent, abutting, or to the left of the current location to compare with column data or samples of each other or of the current location.

According to embodiments, pointers 172 and 174 may be stored in pointer storage such as in one or more data buffers, computer buffers or computer memory. For example, according to embodiments, write pointers 172 may be a column buffer write pointer and a row buffer write pointer stored in a column buffer write pointer storage and a row buffer write pointer storage, respectively. Similarly, read pointers 174 may be one or more column buffer read pointers and two or more row buffer read pointer stored in at least one column buffer read pointer storage and at least two row buffer write pointer storages, respectively.

Also, according to embodiments, read pointers 174 may be related to; derived, defined, selected, or created from; or determined by selecting, comparing, or considering the location, address, block, or buffer of write pointers 172. Specifically, the column or row reference data locations, buffers, blocks, or addresses corresponding to write pointers 172 may be considered to point read pointers 174 to appropriate reference data locations in column or row reference data locations, buffers, blocks, or addresses, respectively, by looking up the read pointers in a table or calculating using a mathematical operation. Thus, more than one appropriate row or column read pointers may be determined by pointing to an appropriate adjacent, neighbor, or abutting reference data locations to one or more current locations (e.g., a current location pointed to by a row or column pointer of write pointers 172) to select, direct, point to, identify, or find reference data at locations 140 (e.g., more than one row or column pointer of read pointers 174) that correspond to reference data stored at or in reference data buffers to be processed by intra-predictor 180 to select and/or create prediction direction 184 and selected reference data 186. Also, pointers 172 and 174 may perform the functions described above for pointers 150 of FIG. 1.

To produce prediction direction 184 and selected reference data 186, intra-predictor 180 may use pointers 150 to select a direction of a location adjacent to a current block of blocks 130 to compare reference data stored in locations 140 for the adjacent locations with the reference data of each other or of the current block. For example, FIG. 2 shows selector 192 to select a reference data location of locations 140 as a selected reference data location (e.g., the location that a read pointer is pointing to) with which to perform direction determination and intra-prediction (e.g., Intra-prediction coding) for the current block or location (e.g., a location a write pointer is pointing to). Thus, the selected reference data location may be a location located in the frame abutting the current block or location being processed. In addition, FIG. 2 shows comparator 194 to compare the data, samples, reference data, pels, components, and/or pixels of the selected reference data location of locations 140 (e.g., the location that a read pointer is pointing to) to perform direction determination and intra-prediction. For instance, selector 192 may select two or more of the reference data locations, reference data buffers, reference data blocks, or reference data macro blocks pointed to by read pointers 174. Thus, comparator 194 may compare the selected two or more of blocks 130 or locations 140 as two or more "selected" reference blocks to compare with each other (e.g., by comparing reference data of each of the reference blocks with each other) to determine or provide prediction direction 184. In some embodiments, according to the prediction direction selected (e.g., direction 184), intra-predictor 180 will select either the row reference data of the top block or the column reference data of the left block as the selected reference data 186.

Although, the MB rows and "marco blocks" described herein (e.g., as know in the art, such as including a structure of Y, Cr and Cb components) are example of blocks for which the concepts described herein apply. For instance, in some embodiments, rows 0-132, 1-133, 2-134, and 3-135; rows of locations 140 (e.g., including even macro block row 142 and odd macro block row 144); rows of pointers 150 (e.g., including even macro block row read pointers 152 and odd macro block row read pointers 154); and other macro block (MB) rows or other rows mentioned here may be defined by rows of samples, pixels, and/or data other than rows of "marco blocks" as know in the art (e.g., other than including rows of Y, Cr and Cb as noted herein). Also, each rows may represent more or less than one, two, three, four, five, six, seven, eight, nine, or ten rows of blocks of more or less than 4×4, 4×8, 8×4, 8×8, 8×16, 16×8, 16×16, 16×32, 32×16, 32×32, etc. . . . samples, pixels, and/or data of a video frame. Moreover, "blocks" as described herein may correspond to various geometries (e.g., square, rectangular, triangular, hexagonal, etc. . . . ) and sizes of portions (e.g., whole, half, quarter, ⅛, ⅙, 1/32, 1/64, 1/128, 1/256, etc. . . . of the width or height) of a video frame. In addition the samples, pixels, and/or data may be for one or more types of luminance, color, chrominance or other types or values of video data or image information (e.g., including or other than Y, Cb, and Cr).

It is also contemplated that system 100 and/or intra-predictor 180 may include a processor, a memory to store an application (e.g., a software, source code, or compiled code application) to be executed by the processor to cause system 100 and/or intra-predictor 180 to perform the functions described herein. Moreover, system 100 and/or intra-predictor 180 may be controlled by a computer or a machine, such as according to a machine accessible medium containing instructions (e.g., software, source code, or compiled code) that when executed by the computer or machine cause the computer or machine to control system 100 and/or intra-predictor 180 to perform functions described herein. In addition, system 100 and/or intra-predictor 180 may include various other logic circuitry, dates, computer logic hardware, memories (e.g., DDR, EEPROM, flash memory, random access memory (RAM), or other types of electronic and/or magnetic memory), comparators, data buffers, and/or registers to perform functions described herein.

System 100 and/or intra-predictor 180 may be in a single or more than one device, internal to a single device, internal or on one chip, internal or on one chip with a processor and one or more data memories or buffers. Furthermore, system 100 and/or intra-predictor 180 may include a memory controller in the same chip, chipset, or die as a processor. In computer systems, a memory controller may interface with main memory (e.g., a DRAM memory). Also, system 100 may include a memory controller that is not contained in the same chipset as a processor. Whether or not a memory controller is in the same chip as a processor, in some cases the memory controller may be called a "memory controller hub (MCH)". Likewise, system 100 and/or intra-predictor 180 may include a chip having one or more processor cores. In some embodiments, the same memory controller may work for all core or processors in the chip. In other embodiments, the memory controller may include different portions that may work separately for different cores or processors in the chip. System 100 and/or intra-predictor 180 may include one or more a dynamic random access memories (DRAMs), but other types of memories may be used including those that do not need to be refreshed. System 100 and/or intra-predictor 180 may include one or more multi-drop interconnects where more than two chips are joined to the same conductor, buses, point-to-point connections, interconnect (e.g., point-to-point or otherwise) such as to connect one or more processors, memories, controllers, chips, video input 176, column reference buffers 149, row reference buffers 169, pointers 172, pointers 174, and/or other electronics or devices necessary to perform video processing as described herein.

Thus, system 100 and/or intra-predictor 180 may process, encode, decode, compress, or decompress video according to various standards, such as an MPEG standard, by reading, comparing, and/or processing samples of a current block or a current reference block of data with samples of an adjacent reference block of data. Specifically, system 100 and/or intra-predictor 180 may use macro blocks as known in the art to perform direction intra-prediction as known in the art to create prediction direction 184 and selected reference data 186 as known in the art.

Moreover, to perform such processes, encoding, decoding, compressing, or decompressing, the required reference data location or buffer size (e.g., buffers 149 and 169) may be dependent upon the video size or amount of video data or samples. For example, to save 16 reference data samples for an 8×8 block of 16 macro blocks of illumination samples, a location or buffer including 16×4×16=1024 samples is required. Thus, a design that reduces the number of locations or buffer size for storing reference data can reduce memory size and costs, especially if the buffer is an internal buffer of a chip or embedded device, such as being located in the same chip, chipset, or die as described herein.

FIGS. 3-6 and description thereof will describe the sample and component structure for an 8×8 block of 16 macro blocks, and reference data and data locations for two rows of the macro blocks. Then, FIGS. 7-11 and description thereof will describe ways to cut down the required size of the locations or buffers to store reference data.

FIG. 3 shows macro blocks of digital video data. FIG. 3 shows macro blocks 130 including Y component 210, Cb component 220, and Cr component 230. Y component 210 includes blocks of luminance samples, MB0Y, MB1Y, MB2Y . . . MB15Y. Similarly, Cb component 220 includes blocks of blue chrominance samples, MB0B, MB1B, MB2B . . . MB15B. Likewise, Cr component 230 includes blocks of red chrominance samples, MB0R, MB1R, MB2R . . . MB15R. The macro blocks and components thereof shown in FIG. 3 may be for or from (e.g., by including samples from) digital frames of data (e.g., one of frames of data 119-122) of a digital video sequence (e.g., sequence 110). Specifically, Y component 210 may correspond to brightness or luminance samples or components as described above for FIG. 1 with respect to blocks 130. Also, Cb component 220 may correspond to color components or samples, such as blue chrominance samples as described above at FIG. 1 for blocks 130. Similarly, Cr component 230 may correspond to samples or components of color, such as red chrominance samples as described above at FIG. 1 for blocks 130. Blocks 130 may be macro blocks of video with a 4:2:0 format where each macro block is organized by a 16×16 block of luminance samples (Y), an 8×8 block of blue chromatic samples (Cb), and an 8×8 block of red chromatic samples (Cr). Each 16×16 block of Y samples may be further divided into four 8×8 blocks of luminance samples Y0, Y1, Y2, and Y3) as shown by the dotted lines in component 210. In other words, blocks 130 may represent a video frame containing 64×64 pixels where each pixel is represented by Y, Cb, and Cr components with a 4:2:0 sub-sampling format, in 16 macro blocks, where each macro block contains four Y blocks, one Cb block, and one Cr block. For example, the four Y blocks may define four 8×8 blocks oriented in a square pattern with 8×8 Y0 block in upper left, 8×8 Y1 block in upper right, 8×8 Y2 block in lower left, 8×8 Y3 block in lower right (e.g., see FIGS. 3 and 5). In addition, a 16×16 block of Y samples including four 8×8 Y0, Y1, Y2, and Y3 blocks may be defined as a "16×16 block" or a "16×16 Y block". Alternatively, blocks 130 may be a 64×64 video area portion of a video frame, such as a portion not including the entire frame. Hence, macro blocks MB0 through MB15 having component 210, 220, and 230 each correspond to a 16×16 pixel region of a frame (e.g., where each macro block MB0 through MB15 is a basic unit for video coding standards such as an MPEG standard).

Each of the blocks of luminance samples of Y component 210 (e.g., block of luminance samples MB11Y) includes four 8×8 blocks of luminance samples, such as shown by the dotted lines in Y component 210. For example, window 240 shows Y, Cr and Cb components of macro block MB11 (e.g., window 240 shows the samples of luminance and color for macro block MB11 of blocks 130 of FIG. 1). As shown, MB11 has 16×16 block of luminance samples MB11Y, 8×8 block of blue chrominance samples MB11B, and 8×8 block of red chrominance samples MB11R. In addition, samples of 16×16 block MB11Y are subdivided into four 8×8 blocks MB11Y0, MB11Y1, MB11Y2, and MB11Y3. Each block MB11Y0 through MB11Y3 is an 8×8 block of luminance samples, 16×16 block of luminance samples MB11Y. On the other hand, samples MB11B and samples MB11R are 8×8 blocks of samples only. Thus, there are four times as many luminance samples for each macro block as there are blue chrominance or red chrominance samples (e.g., hence, the 4:2:0 sub-sampling format distinction).

Video coding processes described above for system 100 of FIG. 1 and/or intra-predictor 180 of FIG. 2 may process video in raster order, from left to right and from top to bottom, such as is described above with respect to intra-predictor 180 of FIG. 2. Thus, a write pointer can process or select a current block of rows 0-132 through row 3-135 of component 210, 220, and 230 in raster format, by processing or pointing to the locations of each block while moving through each row from left to right starting with row 0 and ending with row 3. Moreover, 8×8 blocks of component 210 are processed in similar raster order. Thus, 8×8 blocks of samples MB11Y will be processed MB11Y0, MB11Y1, MB11Y2 and then MB11Y3. For instance, arrow 213 of component 210 shows the order of the processing of 8×8 blocks of samples for 16×16 block MB11Y.

In addition, video processing standards described above for system 100 of FIG. 1 or intra-predictor 180 of FIG. 2, may store all or some of the samples of each block of luminance or color samples of a macro block as data to be used during processing, such as referenced data. For example, FIG. 4 shows row and column reference data of a block of data to store to a buffer. FIG. 4 shows block 400 including columns COL0 through COL7 and rows ROW0 through ROW7. Block 400 may represent any of the 8×8 blocks of luminance samples (e.g., any of MB11Y0 through MB11Y3 of FIG. 3), an 8×8 block of Cb samples (e.g., MB11B of FIG. 3), or a 8×8 block of Cr samples (e.g., MB11R of FIG. 3). Specifically, block 400 includes column 0 row 0 sample C0 R0, column 1 row 0 sample C1 R0, column 2 row 0 sample C2 R0 . . . through column 7 row 7 sample C7 R7. Thus, any of these samples such as column 4 row 2 sample C4 R2 may correspond to one of the samples of an 8×8 block of luminance or of a 8×8 block of blue or red chrominance samples.

Also, locations of reference data locations 140 (e.g., location RD0) may store or correspond to a buffer (e.g., a location, address, or buffer of buffers 149 and/or 169 if FIG. 2) that store the samples of row 0 and/or of column 0 of block 400 (e.g., that stores ROW0 of samples and/or COL0 of samples). For example, only the first column of 8 samples of each of blocks MB11Y0 through MB11Y3, MB11B, and MB11R of FIG. 3 may be stored in a buffer (e.g., column reference buffers 149 corresponding to locations 140 of FIG. 1) as a first column of column reference data (e.g., samples). Specifically, the location or buffer may store the samples at C0 R0, C0 R1, C0 R2, C0 R3, C0 R4, C0 R5, C0 R6, and C0 R7 for a total of 8 samples. Similarly only the first row of 8 samples of each of blocks MB11Y0 through MB11Y3, MB11B, and MB11R of FIG. 3 may be stored in a buffer (e.g., row reference buffers 169 corresponding to locations 140 of FIG. 1) as a first row of row reference data (e.g., samples). Specifically, the location or buffer may store the samples at C0 R0, C1 R0, C2 R0, C3 R0, C4 R0, C5 R0, C6 R0, and C7 R0 for a total of 8 samples.

In addition, during video processing by system 100 or intra-predictor 180, reference data for the same components (e.g., for component 210, component 220, or component 230) may be stored together, located together, or stored at or in the same set of buffers. In other words, the first row and column of samples of each block of MB0-MB5 of blocks 130 of FIG. 1 (e.g., see first row and column of block 400) may be stored in one or more separate buffers for each of Y, Cr and Cb components (e.g., three sets of two buffers, such as buffers 149 and 169). Thus, one set of column and row buffers stores reference data for luminance samples (e.g., reference data for Y component 210), one set of column and row buffers stores reference data for Cb samples (e.g., samples for component 220), and one set of column and row buffers stores reference data for Cr samples (e.g., samples for component 230).

Furthermore, video processing by system 100 or intra-predictor 180, may use reference data from blocks adjacent to, next to, neighboring, or abutting in location to the current block location (e.g., pointed to by a write pointer). Such locations may include only one row "above" (e.g., located vertically above in the frame) the row the current block is located in. Hence, processing can be performed while storing reference data samples for only four rows of Y components and only two rows Cb/Cr components, since during processing, the row that includes the current block and the row that is required for processing and is either vertically above or horizontal left of the current block in such a scheme. Note that one macro block rows has two block rows of Y components and has one block rows of Cb and Cr components. As such, reference data locations and pointers are only necessary for two macro block (MB) rows, such as an even MB row and an odd MB row of the macro blocks of blocks 130 of FIG. 1 (e.g., see locations 140 and pointers 150 of FIG. 1).

Figure 5:
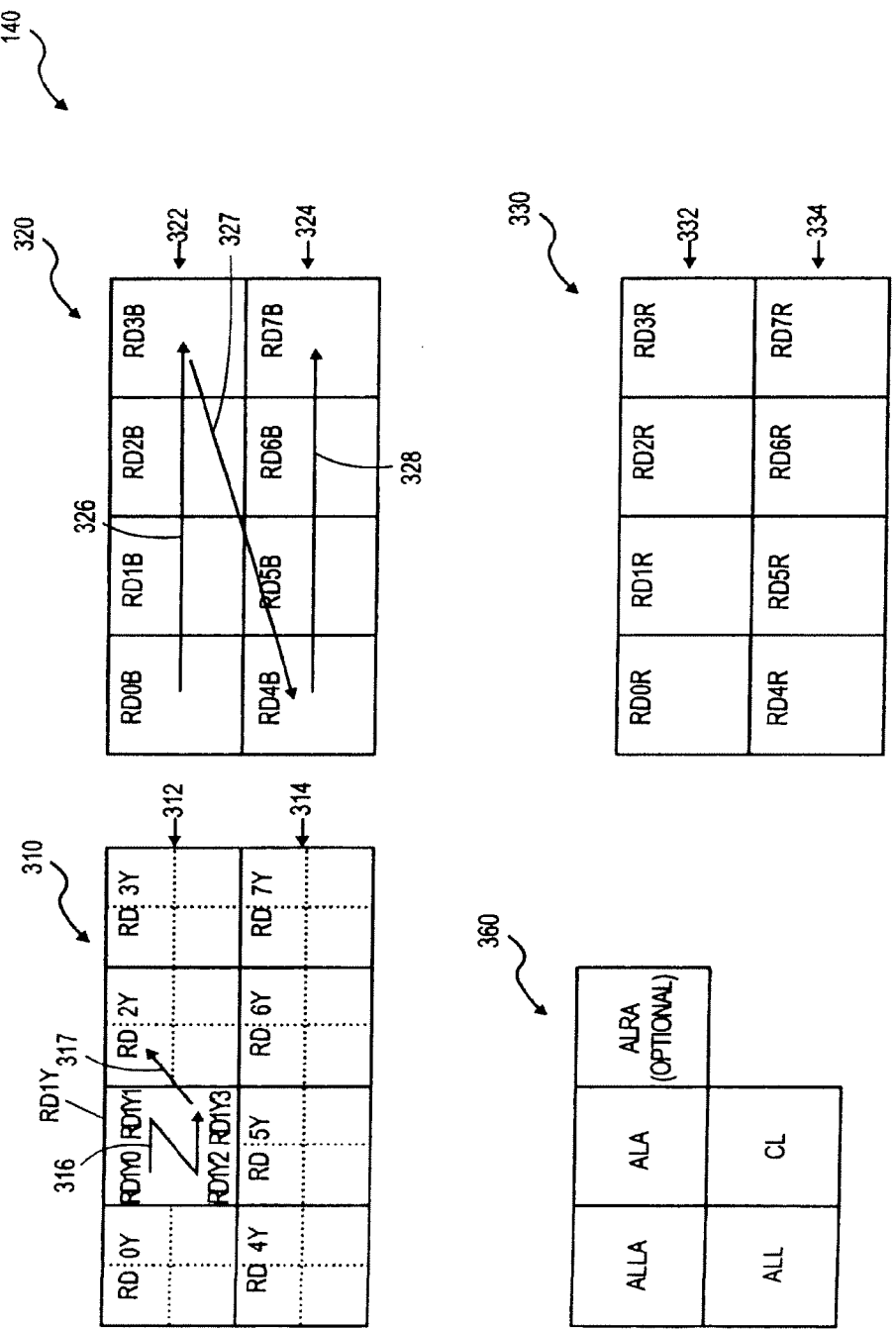
FIG. 5 shows locations of reference data locations of macro blocks.

For instance, FIG. 5 shows locations of reference data of macro blocks according to some embodiments. FIG. 5 shows reference data locations 140 divided into separate locations for column reference data or row reference data of each of the Y, Cb, and Cr components. FIG. 5 shows four rows of Y reference data locations 310, two rows of Cb reference data locations 320, and two rows of Cr reference data locations 330. Data locations 310 is shown having even row 312 including RD0Y, RD1Y, RD2Y and RD3Y; and having odd row 314 having RD4Y, RD5Y, RD6Y, and RD7Y. Likewise, data locations 320 is shown having even row 322 having RD0B, RD1B, RD2B, and RD3B; and having odd row 324 having RD4B, RD5B, RD6B, and RD7B. Similarly, data locations 330 is shown having even row 332 with RD0R, RD1R, RD2R, and RD3R; and odd row 334 having RD4R, RD5R, RD6R, and RD7R. Each reference data location of data locations 310 (e.g., RD0Y), data locations 320 (e.g., RD0B), or of data locations 330 (e.g., RD0R) may correspond to the location of samples of reference data for the separate components (e.g., Y, Cb, and Cr).

For instance, locations RD0Y, RD0B, and RD0R may correspond to column reference data or row reference data of location RD0 of locations 140 of FIG. 1 and/or may correspond to the location of buffers where the samples are stored (e.g., buffers 149 or 169 of FIG. 1). In other words, each location of locations 140 (e.g., RD0) may define a locations of reference data in each of locations 310, 320, or 330 (e.g., RD0Y, RD0B, and RD0R).

Thus, each location of locations 310 may store or correspond to 32 samples of referenced data. Hence, RD1Y may be a location of 32 samples of column reference data or row reference data of a macro block having locations for four 8×8 blocks of 8 samples each (e.g., a first column of 8 or a first row of 8 samples), where RD1Y0 is a location of 8 samples (e.g., a first column of 8 samples or a first row of 8 samples), RD1Y1 is a location of 8 samples, RD1Y2 is a location of 8 samples, and RD1Y3 is a location of 8 samples. Alternatively, locations of reference data locations 320 and 330 (e.g., RD0B or RD0R) may be locations of only 8 samples per macro block, such as 1 row of 8 samples or 1 column of 8 samples of reference data for RD0B.

Processing, write pointing, or selecting a current block may include moving through macro block, 16×16 block, or 8×8 block locations of or corresponding to locations 310, 320, or 330 in raster order to determine prediction direction 184 and selected reference data 186 as described with respect to FIGS. 1 and 3. In other words, at a first level, for locations of locations 310, 320, or 330 a writing pointer or current block may be selected along a path of macro blocks (e.g., 16×16 blocks for Y; or 8×8 blocks for Cb and Cr) that corresponds to moving along an even MB row of locations as shown by line 326, then transition to the next odd MB row as shown by line 327, and continues along that subsequent odd MB row as shown by line 328.

In addition, since data locations 310 include four 8×8 Y blocks in a macro block (e.g., 16×16 Y block RD1Y includes four 8×8 blocks RD1Y0, RD1Y1, RD1Y2, and RD1Y3), processing may consider reference locations of the four 8×8 Y blocks in a macro block (e.g., RD1Y0-3 of RD1Y) in raster order. Specifically, for 16×16 Y block RD1Y, processing may consider the 8×8 blocks in the order RD1Y0, RD1Y1, RD1Y2, and then RD1Y3). While moving along row 312 of data locations 310, processing (such as considering reference data of locations 310 related to a writing pointer or current block) may move along line 316 of block RD1Y. Then, after processing block RD1Y, processing may continue along line 317 to process block RD2Y. After processing for locations along line 328, even row 322 may be overwritten with reference data (e.g., according to or at a write pointer, such a pointer of write pointers 172 of FIG. 2) for the next or subsequent even MB row of macro blocks of the frame (e.g., of blocks 130) and processing may reoccur for locations along line 326 for that subsequent even MB row of locations.

Furthermore, processing may include selecting, comparing, considering or reading reference data from adjacent or abutting locations, addresses, or buffers to a current location (e.g., a location pointed to by a pointer of write pointers 172 of FIG. 2), such as locations to the left of, to the left and above, above, and optionally to the right and above the current location when determining prediction direction 184 and selected reference data code 186 as described above for FIG. 1. For example, template 360 of FIG. 5 shows current location CL (such as a location of a macro block of blocks 130, locations 140, data locations 310, data locations 320, or data locations 330 being processed, selected, considered, or pointed to by a write pointer). Template 360 also has adjacent or abutting left location ALL, left and above location ALLA, above location ALA, and optional right above location ALRA. Thus, when the write pointer or current block being processed is at current location CL of template 360, locations ALL, ALLA, and ALA provide three locations for reference data adjacent to CL.

Moreover, template 360 may be applied at the block level. For example, locations CL, ALL, ALLA, ALA, and ALRA may each correspond to the location of reference data for an 8×8 Cb or Cr block (e.g., RD0B or RD0R) or for an 8×8 Y block (e.g., RD1Y0, RD1Y1, . . . ). Thus, for a write pointer or current block corresponding to a block location of locations 310, 320, or 330, adjacent locations may be considered in accordance with applying template 360 at the 8×8 block level. Note that since template 360 only includes two rows of adjacent or abutting locations, only 2 rows of reference data and reference data locations need to be saved in buffers, such as at data locations 310, 320, or 330.

Where processing of a current block only requires selecting, comparing, or considering reference data from two rows of adjacent or abutting blocks, the "far away", non-adjacent, or non-abutting blocks are "no more used" and can be overwritten row by row (e.g., according to or at a write pointer, such as a pointer of write pointers 172 described for FIG. 2). Thus, as processing (e.g., one or more write pointers) continues to subsequent rows, the unused, even, or odd MB row of data locations 310, 320, or 330 may be overwritten with subsequent reference data so that an entire frame can be processed with less than or equal to four rows of Y reference data and two rows of Cr and Cb reference data. Specifically, it is possible to overwrite the referenced data stored in buffers or at locations in a block by block sequence using one or more writing pointers, such as to overwrite locations RD0Y, RD0B, RD0R of data locations 310, 320, and 330 in a location by location fashion for both column reference data and row reference data.

For example, Cb reference data locations corresponding to column reference data or row reference data of row 0-132 of blocks 130 of FIG. 1 may be stored in locations of row 322 of data locations 320 and reference data locations for column reference data or row reference data of row 1-133 may be stored in locations of row 324. After processing along line 328 to process macro blocks of row 1-133 of FIG. 1, locations of row 322 may be overwritten (e.g., according to or at a write pointer, such as a pointer of write pointers 172 described for FIG. 2) with reference data locations for column reference data or row reference data of row 2-134 of FIG. 1 so that that row can then be processed along line 326. Note that when processing row 2-134 of FIG. 1 by considering locations overwritten into locations of row 322 along line 326, the adjacent or abutting locations above the current location being processed along line 326 will still exist since the row 1-133 of FIG. 1 data is still stored in locations of row 324. After processing row 2-134 of FIG. 1, the row 1-133 data of FIG. 1 in locations of row 324 may be overwritten with row 3-135 data of FIG. 1 and processed along line 328, and so on.

How the reference data is compared may depend on the coding standard. Referring to FIG. 5, for some standards, assume that the DC (e.g., where DC is the 1st data in an 8×8 intra block) of ALLA, is X, the DC of ALA is Y, and the DC of ALL is Z. Then for direction determination, the comparison is, if ($|X-Y|>|X-Z|$), use column reference of ALL to predict. Else use row reference of ALA to predict. The purpose of this comparison is to decide the prediction direction of selecting the top or the left block to the current block as the reference data. For intra-prediction coding, the decoder adds the row reference data of ALA to the 1st row data of current block, CL; or adds the column reference data of ALL to the 1st column data of CL, depending on the prediction direction while the encoder, subtracts the row reference data of ALA from the 1st row of CL or the column reference data of ALL from the 1st column of CL.

In some cases column reference data from the reference data location to the left and adjacent or abutting (e.g., a first column of 8 samples of reference data from the block to the left of the current block or location) is compared (e.g., values or data representing the component samples are individually subtracted from the values of) from the corresponding component samples of another reference block or of the current block (e.g., see comparator 194 of FIG. 2). As such, samples C0R0, C0R1 C0R2, etc. . . . of Y3 of MB5 may be subtracted from samples C0R0, C0R1, C0R2, etc. . . . of Y2 of MB6, respectively (e.g., see FIGS. 3-5) during encoding of samples C0R0, C0R1, C0R2, etc. . . . of Y3 of MB5 may be added to samples C0R0, C0R1, C0R2, etc. . . . of Y2 of MB6, respectively, during decoding.

Likewise, in some cases row reference data from the reference data locations above and adjacent or abutting (e.g., a first row of 8 samples of reference data from the block to the left and above, directly above, or to the right and above the current block or location) is compared (e.g., values or data representing the component samples are individually subtracted from the values of) from the corresponding component samples of the current block. As such, samples C0R0, C1R0, C2R0, etc. . . . of Y3 of MB1 may be subtracted from samples C0R0, C1R0, C2R0, etc. . . . of Y1 of MB6 respectively (e.g., see FIGS. 3-5) during encoding. Also, samples C0R0, C0R1 C0R2, etc. . . . of Y3 of MB1 may be added to samples C0R0, C0R1, C0R2, etc. . . . of Y1 of MB6, respectively, during decoding.

Because of the structure of locations 310 (e.g., see FIG. 5), locating reference data samples adjacent to an 8×8 block of locations 310 according to application of template 360 to 8×8 blocks of locations 310 may include processing in a path similar to that shown with respect to lines 326 and 328 of locations 320, but will also include processing along line 316 and line 317 for 8×8 blocks of each macro block. Thus, movement of a write pointer or current block, and determining read pointers to access column reference data or row reference data of reference data at locations adjacent thereto is more difficult for locations 310.

For instance, FIG. 6 shows reference data locations for two rows of Y components. FIG. 6 may represent a traditional reference buffer structure to store the row and column reference data samples together in one buffer. Thus, the numbers in the blocks of FIG. 6 may be locations of the traditional reference buffer structure. FIG. 6 shows two MB rows of Y reference data locations 310, such as the column and row luminance reference data for reference data locations 140 of blocks 130 of FIG. 1. Locations 310 are shown including even row 612 and odd row 614 corresponding to locations for storing column and row reference data luminance samples for two rows of blocks 130 of FIG. 1. Row 612 includes storage for MB0 through MB3, as well as MB8 through MB11 of FIG. 1. Similarly, row 614 includes MB4 through MB7, and MB12 through MB15 of FIG. 1. FIG. 6 also shows reference data locations for the 8×8 blocks divided by dotted lines, such as where each macro block (MB) includes blocks Y0, Y1, Y2, and Y3.

Moreover, the reference data location for block MB0 or MB8 shows the number, address, or a location number for the first data sample of column and row reference data stored in each block (such as the number a write pointer, such as a pointer of write pointers 172 described for FIG. 2, will point to or address). Specifically, for MB0, FIG. 6 shows a 0 in the location of block Y0 corresponding to the first sample of luminance reference data being at location 0, a 16 in the Y1 block indicating that the first sample there is at location or address 16, a 32 at the Y2 block, and a 48 at the Y3 block. Similarly, the reference data location for MB1 continues in the raster sequence as described above such that the location or address for the Y0 block of MB1 begins at 64 and continues incrementing in increments of 16 as described for blocks in MB0.

Row 612 and 614 can store data or samples for different blocks during processing (e.g., of blocks 130) due to over writing, as noted above. For example, a writing pointer may be generated starting from 0 and increasing by a constant number to the first sample of reference data for the next block. The writing pointer may then return to 0 after it moves past the reference data for the last 8×8 Y3 block of the odd macro block row (e.g., by moving through all the reference data samples for Y3 of MB15 of row 614 which start at 496 and end at 511). As the progress of the writing pointer is predictable, reading pointers can be generated or point to locations by accounting for or considering the writing pointer locations. Hence row 612 will includes storage for MB8 through MB11 when MB0 through MB3 are overwritten according to or at a write pointer, such as a pointer of write pointers 172 described for FIG. 2, because MB0 through MB3 are no longer needed during processing.

The size of locations and buffers for storing the reference data can be reduced by noting that column reference data is only required from the block located to the left of the current blocks according to some video processes, encoding, decoding, compression, or decompression (e.g., according to various standards, such as an MPEG standard). In these cases, only column reference data is required when reading, comparing, and/or processing samples of a current block or a current reference block of data, with samples of a reference block of data located adjacent or abutting and to the left of the current block.

Thus, the current block, which is being predicted, needs to be column reference data for the prediction only when its left neighbor block is selected as the reference block. The column reference data can be read out of the buffer or location for the current block prediction only if its corresponding or reference block is the block located to the left of the current block. Specifically, referring to FIG. 6, if block Y3 of MB5 needs reference data of block Y2 of MB5, the system (e.g., system 100) will read the column reference data for block Y2 of MB5 and process that data with data from block Y3 of MB5. On the contrary, if block Y3 of MB5 needs reference data of block Y1 of MB5, then the system will read the row reference data from block Y1, but not the column reference data. In other words, for certain processing, the system is only concerned with the first column of reference data for reference data blocks located to the left of the current blocks, and is only interested in the first row of referenced data for reference data blocks located above left, above, or above right of the current blocks.

Moreover, in the time domain during processing, the reference data stored for the block located to the left of the current block is close to the current block, from the view of a time domain or process sequence. For instance, although the reference data for a block located above the current block may have been written to a buffer when writing data for a current block 14 blocks prior (e.g., when the reference data for block Y3 of MB1 is read to evaluate block Y1 of MB5, as the current block, as shown in FIG. 6) the reference data for a block to the left of current block may have been written up to only three blocks previous (e.g., where the reference data for block Y1 of MB5 was written, block Y2 of MB5, and block Y3 of MB5 were written prior to block Y0 of MB6 being the current block, as shown in FIG. 6.) Thus, the left block of Y0 or Y2 is in the previous macro block, but only three blocks away from Y0 or Y2. Likewise, the left block of block Y1 or Y3 is in the same macro block as Y1 or Y3 but only one block away, as shown in FIG. 6.

Hence, while the row reference data for some processes must be kept, located, or stored for a longer period of time, such as for a period in the time domain or processing sequence greater than the time required to process a row of blocks (e.g., even row 612), the column reference data only needs to be located, stored, or saved (e.g., in a buffer, like buffer 169) for no more than the processing time for processing three blocks (e.g., such as blocks Y1, Y2, and Y3 of MB5). In other words, the life cycle of the column reference data is not more than the time for processing three blocks. After this time duration, that column reference data becomes "no-more-used" and can be overwritten by the other column reference data (e.g., by being overwritten by a column reference data write pointer). Hence, the column and row reference data location or buffer space to store the row and column reference data together can be reduced by separating the column reference data from the row reference data, and storing the column reference data in a location or buffer having a reduced size.

For instance, FIG. 7 shows row and column reference data locations for two rows of Y components corresponding to FIG. 6. Corresponding to FIG. 6, FIG. 7 may represent a traditional reference buffer structure to store the row and column reference data samples together in one buffer. Thus, the numbers in the blocks of FIG. 7 may also be locations of the traditional reference buffer structure. FIG. 7 shows two MB rows of Y reference data locations 310, such as the column and row luminance reference data locations for reference data locations 140 of blocks 130 of FIG. 1. The reference data locations for block MB0 or MB8 shows the number, address, or a location number for the first data sample of column and row reference data stored in each block (such as the number a write pointer, such as a pointer of write pointers 172 described for FIG. 2, will point to or address). Specifically, for MB0, FIG. 6 shows a 0 in the location of block Y0 corresponding to the first sample of luminance row reference data being at location 0, and an 8 in the location of block Y0 corresponding to the first sample of luminance column reference data being at location 8. Also, a 16 in the Y1 block indicates that the first row sample there is at location or address 16, and a 24 in the location of block Y1 corresponding to the first sample of luminance column reference data being at location 24. Correspondingly, a 32 and 40 at the Y2 block, and a 48 and 56 at the Y3 block. The reference data location for MB1 continues in the raster sequence as described above such that the location or address for the Y0 block of MB1 begins at 64 and continues incrementing in increments of 8 for each set of column and row reference data as described for blocks in MB0.

Although two rows of row reference data may be needed as described above for FIG. 6, the number of column reference data locations or storage can be reduced since only column data from the block located to the left of the current block, location, or column buffer write pointer needs to be read according to some video processing processes. In other words, the "far away", or "no more used" column reference data of FIG. 7 can be overwrite the column reference data of any row once the a column buffer write pointer moves to the next row. Specifically, once the column buffer write pointer moves to MB1, the column reference data for MB0 can be overwritten. Thus, for column reference data it is not necessary to wait for the reference data for block MB8 to overwrite that of block MB0, as it is for row reference data. Instead, the column reference data locations, addresses, pointers, offsets, buffers, storage, memory, etc. can be separated from the row reference data and reduced to only enough column reference data locations, addresses, pointers, offsets, buffers, storage, memory, etc. necessary to selecting, comparing, consider or read the column reference data required by the video processes, encoding, decoding, compression, or decompression being implemented.

For processing according to various standards that only require reading, comparing, and/or processing column reference data samples of a current block with samples of a reference block of data located to the left of the current block, the column reference data can be reduced to less than or up to one row of column reference data locations, addresses, pointers, offsets, buffers, storage, memory, etc. For instance, if the column reference data are stored in a separate location or buffer, such as a column reference buffer with a size of equal to or no more than 32 samples (e.g., a maximum size of 8 samples of column reference data for up to 4 blocks or locations of reference data), then the size of the locations, memory, buffer, or address space necessary to store the row and column reference data can be cut to approximately half the size shown in FIGS. 6-7, since it is only necessary to store row reference data for the blocks shown in FIGS. 6-7, and column reference data for 1 macro block.

Specifically, FIG. 8A shows row reference data locations for two macro block rows of Y components, according to some embodiments. FIG. 8A may represent an embodiment of an inventive reference buffer structure to store the row reference data samples (shown) in a separate buffer than a buffer used to store the column reference data samples (not shown). It is contemplated that both buffers may be implemented in a single memory structure or device. Thus, the numbers in the blocks of FIG. 8A may be locations of an embodiment of an inventive reference buffer structure that are one half of the number (e.g., store on half of the number of samples) of the locations of the traditional reference buffer structure of FIG. 6. In other words, each block in FIG. 8A represents only the row reference data of Y components. For instance, FIG. 8A shows two MB rows of row Y reference data locations 810, such as the row luminance reference data for reference data locations 140 of blocks 130 of FIG. 1. Locations 810 are shown including even row 812 and odd row 814 corresponding to locations for storing row reference data luminance samples for two rows of blocks 130 of FIG. 1. Row 812 includes storage for MB0 through MB3, as well as MB8 through MB11 of FIG. 1. Similarly, row 814 includes MB4 through MB7, and MB12 through MB15 of FIG. 1. Hence, FIG. 8A shows row reference data locations for the 8×8 blocks divided by dotted lines, such as where each macro block (MB) includes blocks Y0, Y1, Y2, and Y3. Locations 810 may correspond to locations 310, even row 812 to row 612, and odd row 814 to row 614 of FIG. 6 as described above, except locations 810, row 812, and row 814 only contain locations for row reference data.

Figure 8B:
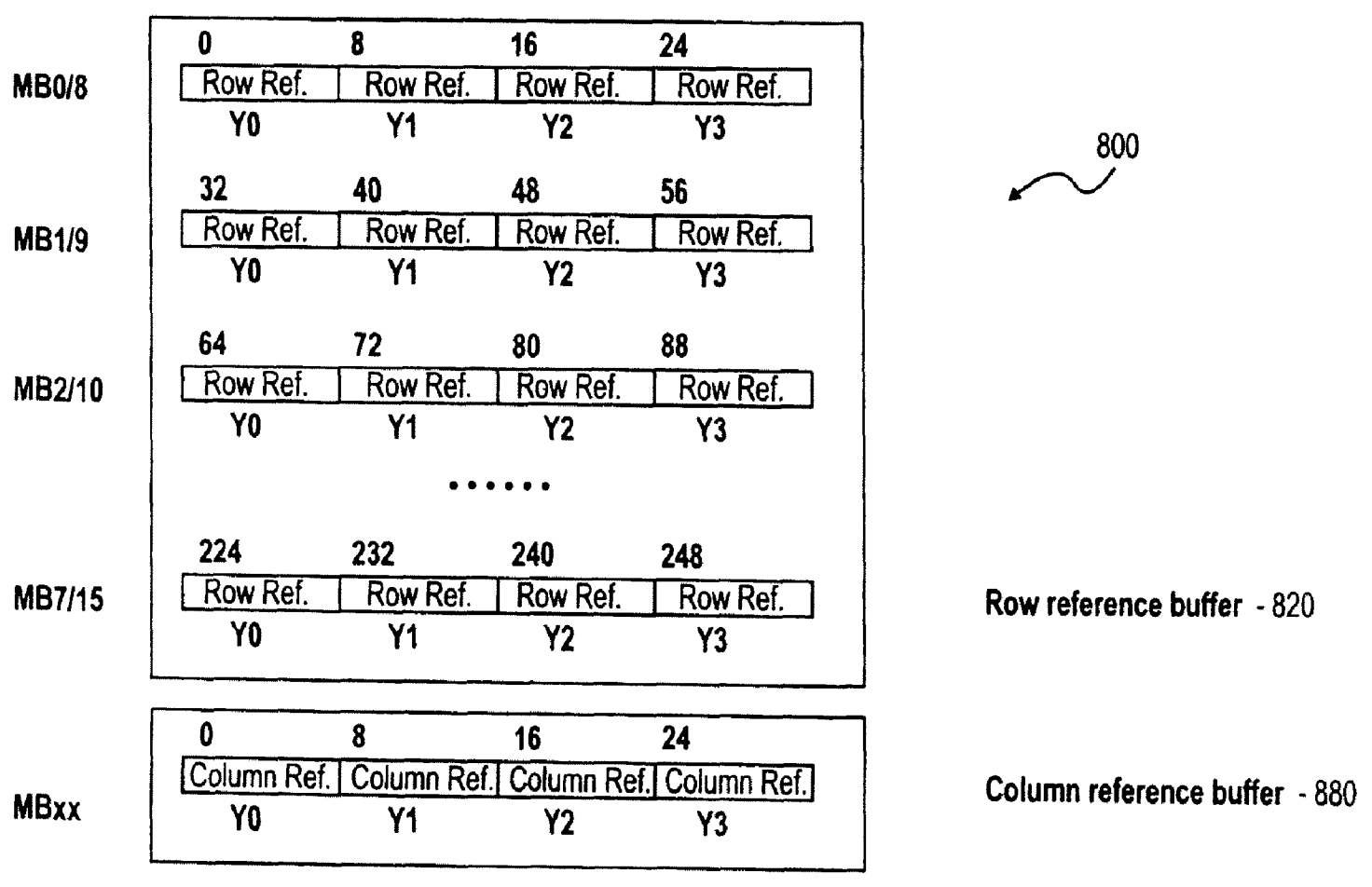

FIG. 8B shows separate row reference data locations and column reference data locations for two rows of Y components, according to some embodiments. FIG. 8B may represent an embodiment of an inventive reference buffer structure to store the column reference data samples in one buffer and to store the row reference data samples in a separate buffer (although both buffers may be implemented in a single memory structure or device). Thus, the numbers in the blocks of FIG. 8B may be locations of an embodiment of an inventive reference buffer structure that are one half of the number of the Y component row reference data samples of the locations of FIG. 7 in one buffer, and a number to store one macro block in size of the Y component column reference data samples of the locations of FIG. 7 in another buffer. The column reference data samples may span across two adjacent macro blocks, but in some embodiments need only contain (e.g., may have no more than) a number of samples corresponding to the size of one macro block. FIG. 8B shows row reference buffer 820 and column reference buffer 880. According to embodiments, row reference buffer 820 may correspond to row reference buffers 169. Similarly, according to embodiments, column reference buffer 880 may correspond to column reference buffers 149. Row reference buffer 820 includes the location, number, address, or buffer for the row reference data samples stored for each block of FIG. 7, renumbered to exclude the column reference data. For example, the row reference data samples for Y0 of MB0 start at 0, the row reference samples for Y1 of MB0 start at 8, the row reference samples for Y2 of MB0 start at 16, the row reference samples of Y3 of MB0 start at 24, the row reference data samples for Y0 of MB1 start at 32, etc. . . . In other words, instead of starting at 16, the row reference samples or Y1 of MB0 start at 8. Similarly, column reference buffer 880 includes the column reference data samples for the blocks of FIG. 7.

However, since as noticed above, it is only necessary to store samples for up to one macro block for column reference data, column reference buffer 880 may include column reference data locations, or storage for only 4 Y blocks or 1 macro block. Specifically, buffer 880 stores, for any macro block (e.g., for MBxx) column reference data samples for Y0 of MB0 beginning at location 0, column reference data samples for Y1 of MB0 beginning at location 8, column reference data samples for Y2 of MB0 beginning at column 16, column reference data samples for Y3 of MB0 beginning at location 24, column reference data samples for Y0 of MB1 beginning at 0, etc. Of course, as locations in buffer 880 are overwritten during processing, buffer 880 may include reference data from more than one row, macro block, or block. For instance, buffer 880 may store column reference data for no more than two macro-blocks, such as column reference data for no more than Y0 of MB7, Y1 of MB6, Y2 of MB6, and Y3 of MB6 when processing Y0 of MB7 (e.g., current block). Here, Y1 of MB6 may be the reference block compared to Y0 of MB7 (e.g., having its column reference data compared to that of Y0 of MB7). Correspondingly, buffer 880 may store, or a smaller buffer may be used to store column reference data for no more than Cr or Cb block for MB8 when processing Cr or Cb of MB9.

According to embodiments, a column reference buffer may include only enough storage to store column reference data back to or including the location to the left of the current location (e.g., column buffer write pointer) plus one location for data to be written for the current location (e.g., written by the column buffer write pointer). Thus, the location to the left for buffers 820 is at most three locations away, and a fourth location is required for writing to, for a total of four locations of 8 samples each. Similarly, for Cr or Cb, the concept can be applied by including at most one location away from the current location, and a second location for writing to, for a total of two locations of 8 samples each.

For instance, as shown in FIG. 8B, the sample, location, buffer, or address size of buffer 820 is only half of the size of a buffer in FIG. 7, and the size of buffer 880 is 32. Correspondingly, for a high definition television, according to some processing and architecture, a reference buffer size with a 2 macro-block-row rotation architecture is 15,360 for the Y components, however, using a buffer structure or architecture shown in FIG. 8B, the size is reduced to (15,380 divided by 2)+32=7,712.

In some cases, the concepts described herein, such as with respect to buffers 820 and 880, can be used to store a type of reference data sample (e.g., row or column reference data) from block of no or not more than two macro-block of a digital video frame (e.g., to store the reference data in a buffer or in reference data locations) while or in order to complete the prediction direction determination and the intra prediction of a current block of the digital video frame. In fact, the reference data samples may be from not more than two blocks of chrominance samples and/or not more than four blocks of luminance samples (e.g., column reference data samples). Also, the process performed may include selecting a direction for intra prediction and producing a code for intra prediction by selecting a current location in the frame and storing column reference data for no more than two macro-block locations during selecting a direction and producing code. More particularly, in some processes, a column reference data buffer may store a sample of column reference data for each 8 by 8 block of no more than two adjacent macro-blocks of Cb samples and Cr samples, as well as no more than four adjacent macro-blocks of luminance sample (Y0, Y1, Y2 and Y3) of no more than two adjacent 16 by 16 macro-block of luminance samples.

Moreover, according to embodiments, the column reference data samples, locations, addresses, pointers, offsets, buffers, storage, memory, etc. stored during processing can be reduced to less than two rows, between one and two rows, only one row, less than one row, no or not more than two macro-blocks, one or less than one macro block, four blocks, three blocks, no or not more than two blocks, or two sequential blocks of reference data or samples (e.g., blocks in sequence, such as when the samples of column reference data are for blocks processed previous in the time domain or process sequence to the current block or location being processed). For instance, buffers 149, 169, 820 and/or 880 may be various sizes or store various amounts of data for various processes where data is written to a row and/or column reference data buffers as it is read out of the buffer and where there is a relationship between the row reference write and read pointers, or a relationship between the column reference write and read pointers that requires consideration of previously stored data from less than two rows or columns, only one row or column, or less than one row or column of macro blocks, or blocks. Also, embodiments include where consideration of previously stored row and/or column reference data is from more than, equal to, or less than one or two blocks or macro blocks to the left or previous in the time domain or process sequence. According to embodiments, buffer 149 may have a different size or store a different amount of data than buffer 169. Likewise, buffer 820 may be a different size or store a different amount of data than buffer 880. In some cases, buffer 820 may be a larger, twice as large, four times as large, eight times as large, twelve times as large, sixteen times as large, 24 times as large, 32 times as large, or 64 times as large, 128 times as large, 256 times as large, 512 times as large, 1024 times as large, 2048 times as large, 4096 times as large, 8192 times as large, or a combination thereof as large as buffer 880. For instance, buffer 820 may be a size to store 128 or 256 samples while buffer 880 stores 32 samples.

Thus, a row write pointer and one or more row read pointers may move through row reference buffer 820 to various locations in correspondence or relation to each other to perform processing with respect to row reference data. Similarly, a column write pointer and one or more column read pointers may move in correspondences or in relation to various locations in buffer 880 to perform column reference data processing.

For instance, as describe for overwriting for FIGS. 5-7, locations, addresses, numbers, buffers, or samples of reference data stored in buffer 820 and/or 880 may be overwritten (e.g., by write pointers) and processed while other locations in buffer 820 and/or 880 are read (e.g., by read pointers) for or during processing. Specifically, row buffer read and write pointers can access buffer 820 to provide the same functionality with respect to row reference data samples, as described above for FIGS. 1-7. For example, where buffer 820 stores row reference data samples of locations 140 of FIG. 1 or 5, row buffer read and write pointers may correspond to or perform the function described above for pointers 150 of FIG. 1, pointers 172 and 174 of FIG. 2, and/or pointers described for FIGS. 5-8. According to some embodiments, row buffer read and write pointers can access buffer 820 similarly to the description above for pointers accessing row reference buffers 169, locations or buffers of locations 140, and locations or buffers of a buffer to store data of locations 310 as described above for FIGS. 1-7, except for buffer 820 it is only required that the row write pointer move by 8 (e.g., instead of 16 for locations or buffers storing both the row and column reference data) for each iteration in the time domain or process sequence. Thus, row buffer read and write pointers can access buffer 820 for an embodiment such as where template 360 includes selecting, comparing, or considering adjacent locations ALL, ALLA, ALA, but not ALRA of current location CL as described above for FIG. 5. Specifically, row buffer read pointers for a row buffer write pointer at block Y1 of MB5 may point to reference data from Y0 of MB5, Y2 of MB1, Y3 of MB1, and optionally Y2 of MB2.

Likewise column buffer read and write pointers can access buffer 880 to provide the same functionality with respect to column reference data samples, as described above for FIGS. 1-7. In some cases, column buffer read and write pointers can access buffer 880 by moving the column write pointer move by 8 (e.g., instead of 16 for locations or buffers storing both the row and column reference data) for each iteration in the time domain or process sequence.

Figure 9:
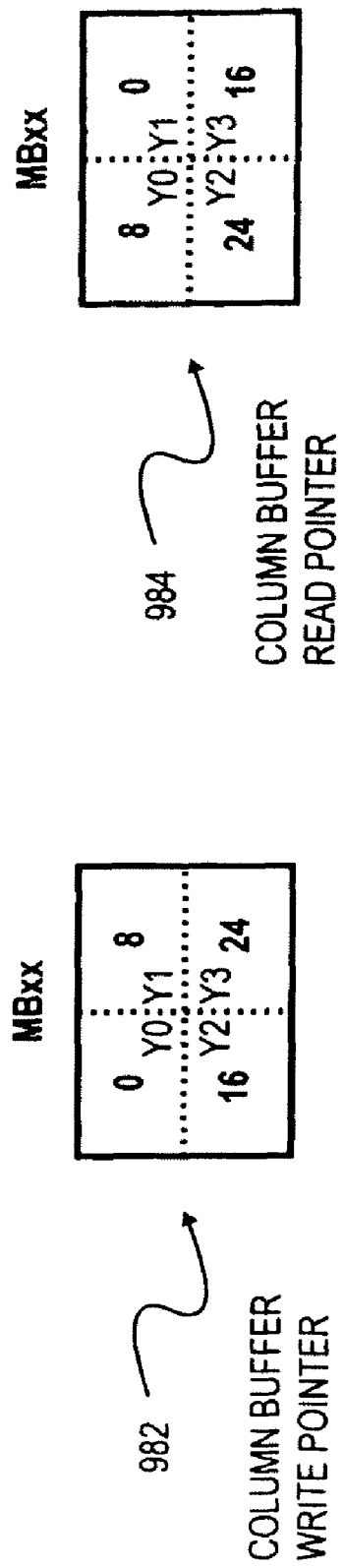
FIG. 9 shows write pointers and read pointers for column reference data locations for two rows of Y components.

For example, FIG. 9 shows write pointers and read pointers for column reference data locations for two rows of Y components, or one MB row of Y components. FIG. 9 shows column buffer write pointers 982 for Y components of column reference buffer 880 of FIG. 8B. FIG. 9 also shows column buffer read pointers 984 for Y components of column reference buffer 880 of FIG. 8B. According to embodiments, where buffer 880 stores column reference data samples of locations 140 of FIG. 1 or 5, pointers 982 and 984 may correspond to or perform the function described above for pointers 150 of FIG. 1, pointers 172 and 174 of FIG. 2, and/or pointers described for FIGS. 5-8. Thus, pointers 982 and 984 of FIG. 9 can access buffer 880 for an embodiment such as where template 360 includes selecting, comparing, or considering adjacent locations ALL, ALLA, ALA, but not ALRA of current location CL as described above for FIG. 5. Specifically, for a column buffer write pointer at block Y1 of MBxx (8) the appropriate column buffer read pointer may point to reference data from Y0 of MBxx (0), where MBxx is any MB.

Pointers 982 may be representative of a single block or macro block, such as by only considering the number for Y0 for a block, where considering Y0 through Y3 for a macro block. Thus, where buffer 880 corresponds to a single block, Cb or Cr, (e.g., to write or store eight samples of column reference data for a single 8×8 block) pointers 982 point to position (0) and column reference data is written from position 0 to position 7 during each write. Alternatively, where buffers 880 represent a macro block, Y0, Y1, Y2, and Y3 pointers 982 point to 0, 8, 16, and 24. Thus, eight samples will be written for Y0 starting at 0, eight samples will be written for Y1 starting at 8, eight samples will be written for Y2 starting at 16, and eight samples will be written for Y3 starting at 24.

In addition, pointers 982 may apply to writing column reference data for various blocks or macro blocks of a frame as described above with respect to buffer 880 of FIG. 8B. For instance, according to embodiments, a column buffer write pointer may point to or write to only enough locations or storage to store column reference data extending back to or including the location to the left of the current location, as explained above for buffer 880 plus the location being written to for the current location (e.g., written by the column buffer write pointer). Thus, the column buffer write pointer for buffers 880 can point to at most three locations away to allow for reading, and a fourth location to write to, for a total of four locations of 8 samples each. Similarly, for Cr or Cb, the concept can be applied by including pointing to read from at most one location away from the current location, and a second location for writing to, for a total of two locations of 8 samples each. Moreover, the concept of pointers 982 as described can be expanded for various size blocks, components, reference data stored, etc. as described herein.

Correspondingly, pointers 984 may be representative of a single block or macro block, such as by only considering the number for Y0 for a block, where considering Y0 through Y3 for a macro block. Thus, where buffer 880 corresponds to a single block (e.g., to read eight samples of column reference data for a single 8×8 block) pointers 984 point to position (8) and column reference data is read from position 8 to position 15 during each read. Alternatively, where buffers 880 represent a macro block, Y0, Y1, Y2, and Y3 pointers 984 point to 8, 0, 24, and 16. Thus, eight samples will be read for Y0 starting at 8, eight samples will be read for Y1 starting at 0, eight samples will be read for Y2 starting at 24, and eight samples will be read for Y3 starting at 16. Pointers 984 apply to reading column reference data for various blocks or macro blocks of a frame as described above with respect to buffer 880 of FIG. 8B.

Also, pointers 984 may apply to reading column reference data from various blocks or macro blocks of a frame as described above with respect to buffer 880 of FIG. 8B. For instance, according to embodiments, a column buffer read pointer may point to or read from only enough locations or storage to read column reference data extending back to or including the location to the left of the current location, as explained above for buffer 880 plus the location being written to for the current location (e.g., written by the column buffer write pointer). Thus, the column buffer read pointer for buffers 880 can point to at most three locations away, and a fourth location being written to, for a total of four locations of 8 samples each. Similarly, for Cr or Cb, the concept can be applied by including pointing to read from at most one location away from the current location, and a second location for writing to, for a total of two locations of 8 samples each. Moreover, the concept of pointers 984 can be expanded can be expanded for various size blocks, components, reference data stored, etc. as described herein.

For a macro block, when pointer 982 point to Y0, pointer 984 will point to 8, when pointer 982 points to Y1, pointer 984 points to 0, when pointer 982 points to Y2, pointer 984 points to 24, and when pointer 982 points to Y3, pointer 984 points to 16. It can be noticed that pointers 984 provide a toggle of position with those of pointers 982. Specifically, when pointers 982 point to 0, pointers 984 point to 8 and vice versa. Similarly, when pointers 982 point to 16, pointers 984 point to 24, and vice versa Moreover, according to embodiments, although the row reference and column reference data are stored in separate buffers, (e.g., buffers 820 and 880) the row buffer read and write pointers have a relationship with the column buffer read and write pointers, for example, the total size of the column reference buffer may be equal to the size of the row reference data for one macro block (e.g., 32 for luminance or Y samples, 8 for Cr or Cb samples, or otherwise depending on the data). In addition, the increment by which the write pointers, read pointers, or data is spaced is the same. For example, for blocks 130 as described herein the increment is 8 for a block. Moreover, the row and column buffer read and write pointers may co-exist in the time domain or during processing.

From the examples above, for reference data locations or buffers storing 8 samples for each block (e.g., each 8×8 block or Y block of a macro block) the column and row buffer write pointers may be created, pointed, stored, selected, addressed, or located by starting at 0, an offset, or a base and incrementing by a constant number (e.g., by an even number, such as by 8 for blocks 130) and reset to 0 after the writing pointers exceed the limit of samples or locations of the column or row reference data (e.g., after the row buffer writing pointer exceeds 255 for buffers 820 and the column buffer writing pointer exceeds 31 for buffers 880 of FIG. 8B. In addition, during processing, it may be desirable to link or equate the location that the column buffer writing pointer and row buffer writing pointer are pointing to, such as to insure that the current location of the video frame in the column reference data (e.g., buffer 880) is the same as the current location in the video frame for the row reference data (e.g., in buffer 820).

Also, according to embodiments, column reference data and row reference data can be saved in the same memory module, buffer, storage device, or set of locations, but at different base addresses. In addition, the column buffer write pointer may be derived from the row reference write pointer using logic or mathematical operations. For instance, the column buffer write pointer may be derived using a modulus operation (e.g., such as the modulus of a congruence, which may be represented by the symbol "%"). Also, if the number of samples of reference data stored for a block is a power of 2, the column buffer write pointer may be derived using a logic "AND" (such as a logical AND outputting a 0 for inputs (0,0), (0,1) (1,0), and outputting 1 or input (1,1)), which may be represented by the symbol "&"). Alternatively, the column buffer write pointer may be reset or initiated (e.g., such as to 0) along with the row buffer right pointer for Y0 and then increased by the column reference size of a block for the next block and iterations thereafter (e.g., by a reference size is 8 samples, or 8).

For example, the concept described above for deriving the column buffer write pointer from the row reference write pointer (e.g., deriving pointers 982 of FIG. 9 from a row reference write pointer described above for writing to buffer 820 of FIG. 8B) may be expanded to other block or macro block structures by considering factors including the reference data size or number of samples of reference data stored for each location or block in the frame (e.g., 8 for a first row of 8 samples or for a first column of 8 samples of a block) and the number of blocks in a macro block for a particular component (e.g., such as four blocks for luminance components Y0 through Y3, and 1 block for components Cr or Cb). Using the above factors, the column buffer write pointer may be derived from the row reference write pointer for a video process or system (e.g., a video processing system, such as system 100 of FIG. 1 or intra-predictor 180 of FIG. 2, using a standard such as an MPEG standard) that considers column reference data to the left, and row reference data to the left top, and top of a current block or write pointer, where there are four blocks of Y reference data for each macro block.

Specifically, the row buffer write pointer of the row reference data of a block may be designated Pwr and its corresponding column buffer write pointer of the column reference data for the same block may be designated Pwc where the example video has a row reference data size equal to a column reference data size for each block designated as REF_SZ. In such an embodiment, Pwc may be calculated by accounting for, considering, performing mathematical operations, or performing logic by one of the following equations:

$$Pwc = Pwr \ \& \ (Nb*REF\_SZ-1) \quad (a)$$

$$Pwc = Pwr \ \% \ (Nb*REF\_SZ) \quad (b)$$

$$Pwc = 0 \ \text{for Y0 and} \ Pwc += REF\_SZ \ \text{for Y1, Y2, Y3} \quad (c)$$

Where Nb is the number of block in one MB for a component. For instance, Nb may be 4 for the Y components and be 1 for the Cb or Cr component. If the base address of row reference and column reference locations or buffers are Br and Bc, respectively, then the physical writing address to the row and column reference data may be (Br+Pwr) and (Bc+Pwc), respectively. For example, if the row buffer write pointer to the row reference data of Y1 of Mb7 is 232, or is 0xE8, the REF_SZ is 8, and its corresponding column buffer write pointer to the column reference data for the Y component is (0xE8 & 0x01F)=0x08, 232% 32=8, or 0x00+0x08=0x08.

According to embodiments deriving the column and row buffer reading pointers from the column and row buffer writing pointers is dependent on the buffer architecture (e.g., such as described above with respect to FIGS. 8 and 9), but the philosophy or concept described above is the same since the relationship between the current block or location and the reference or neighbor blocks or locations to be considered is not affected by the buffer architectures. For instance, as described above for template 360 of FIG. 5 and pointers 982 and 984 of FIG. 9, the reference or neighbor blocks where locations are typically to the left, to the left and above, above, and optionally to the right and above the current block, and the number of reference data samples or data stored or a block is a constant, such as an even number, such as 2, 4, 6, 8, 12, 16, 24, 48, 64, 128, 256, 512, 1024, 2048, or a combination thereof.

Furthermore, the separate row reference data and column reference data buffers store and overwrite column reference data of all blocks or macro blocks in a video frame to the same buffer area or location (e.g., to the same locations shown for Y0, Y1, Y2, or Y3 of buffer 880 of FIG. 8B). In other words, the reference data for Y0 of all macro blocks are saved in the same address of the column reference data (e.g., 0-7 of buffer 880), the column reference data of Y1 of all macro blocks are stored in the same location (e.g., 8-15 of buffer 880), the column reference data of Y2 of all macro blocks are stored in the same place (e.g., 16-23 of buffer 880), the column reference data of Y3 of all macro blocks are stored in the same place (e.g., 24-31 of buffer 880), and so on for structures requiring more than 32 column reference data samples. Thus, buffer 880 may be a column reference data buffer, or storage location adequate to store the column reference data or all of the blocks or macro blocks (e.g. for 64×64 block structure of a video frame), and pointers 982 and 984 may be sufficient to point to or access the column reference data locations required or intra-prediction processing or coding according to various standards, such as according to a MPEG standard.

In the implementation where the number of reference data or samples stored for a block (REF_SZ) is 8 the column buffer read pointer (Prc) can be derived from the column buffer write pointer (Pwc) by the following:

If left block is in the same MB as current MB, $$\text{Prc} = \text{Pwc} - k \ast \text{REF\_SZ} \quad (d)$$

If left block is in a MB other than current MB, $$\text{Prc} = \text{Pwc} + k \ast \text{REF\_SZ} \quad (e)$$

Where k=1 for Y components and K=0 for Cb or Cr components.

Thus, in the example where REF_SZ=8, for FIG. 9, pointers 984 can be derived from pointers 982. For example, if the current block is Y2 of MB 1, then the column buffer write pointer (e.g., pointers 982) points to 16, and the column buffer read pointer (e.g., pointer 984) points to 16+8=24 and Y3 of MB 0 is picked up or pointed to as the current reference block considered, accounted for, or compared to the current block. Further, if the current block is Y3 of MB 1, then the column buffer write pointer points to 24 and the column buffer read pointer points to 24−8=16, and Y2 of MB 1 is selected as the reference block.

The concepts described above with respect to buffers 149 and 169, and row and column reference data locations, buffers, and pointers of FIGS. 1-9 can be expanded to apply to various types of video processing and video encoding or decoding processes (e.g., intra-prediction coding) where for a block being processed or predicted, previously saved reference data is to be read from one or more reference buffers (e.g., from buffers 149, 169, 820 and/or 880), and parts or samples of reconstructed data are to be saved to the reference data buffers for later prediction use (e.g., writing reference data or samples to locations in one or more reference buffers (e.g., from buffers 149, 169, 820 and/or 880). As such, the concepts with respect to buffers 149, 169, 820 and/or 880 may be applied to various processes where data is written to a row and/or column reference data buffers as it is read out of the buffer and where there is a relationship between the row reference write and read pointers, or a relationship between the column reference write and read pointers that requires consideration of previously stored data from less than two rows or columns, only one row or column, or less than one row or column of macro blocks, or blocks. Also, embodiments include where consideration of previously stored row and/or column reference data is from more than, equal to, or less than one macro block, or one block to the left or previous in the time domain or process sequence. Thus, the row or column reference data storage, locations, buffers, etc. can be reduced to store only the amount of reference data required during processing according to the consideration of previously stored reference data as noted above.

Figure 10:
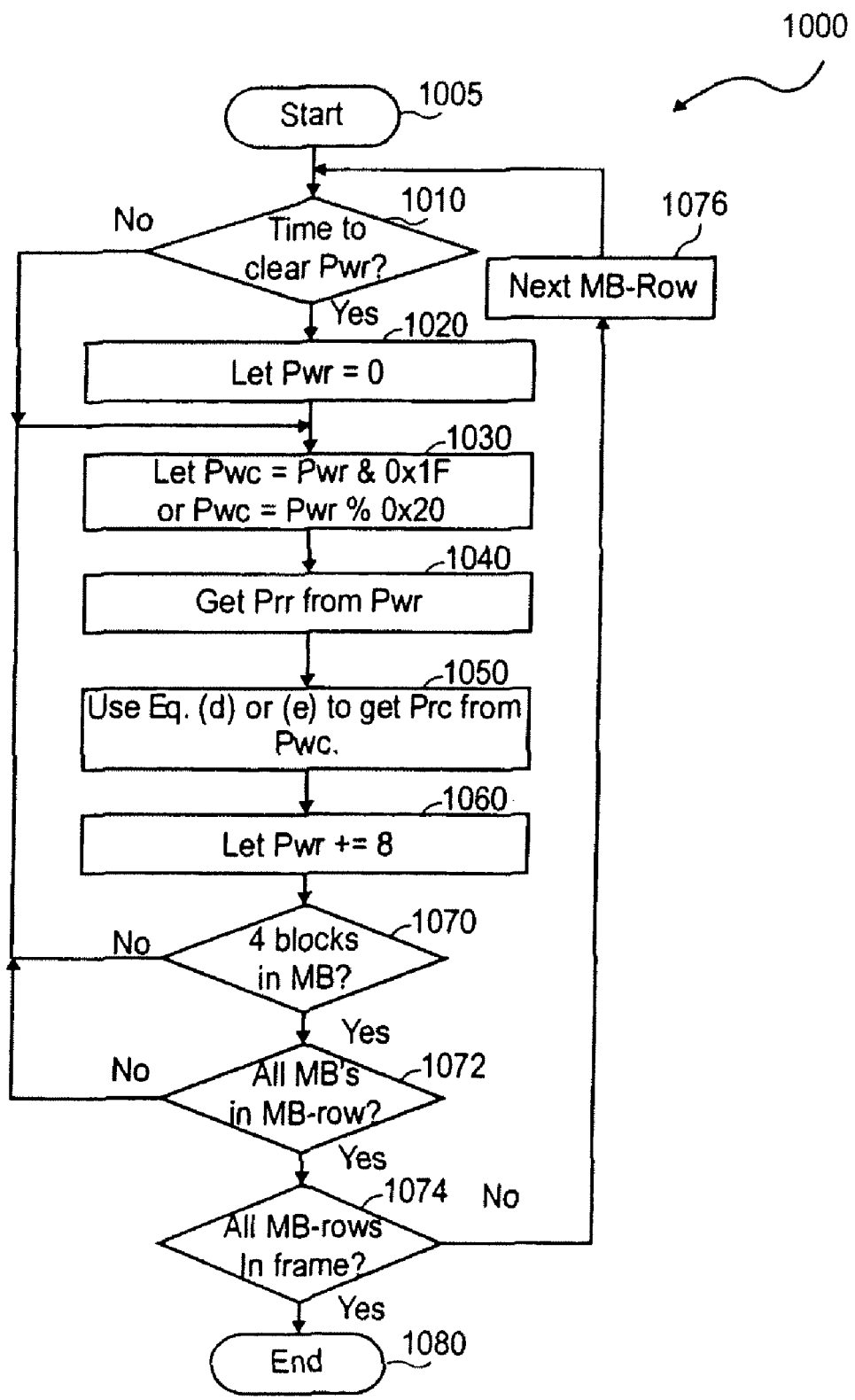
FIG. 10 is a flow diagram of a process for calculating write and read pointers for two rows of Y components.

For example, FIG. 10 is a flow diagram of a process for calculating write and read pointers for two rows of Y components. FIG. 10 shows process 1000, such as a process for generating, selecting, calculating, or pointing a column read pointer and a row read pointer to point to a column reference data location and a row reference data location of a column reference data buffer and a row reference data buffer by accounting for considering or using a column write pointer or row write pointer that also points to a column or row reference data location of the column of row reference data buffer. For example, process 1000 may create pointers or row buffer write pointer (Pwr), row buffer read pointer (Prr), column buffer write pointer (Pwc), and column buffer read pointer (Prc).

At block 1005, process 1000 begins. At block 1010, it is determined whether it is time to clear the row write pointer or the writing pointer to row references or reference data. If at block 1010 it is not time to clear the row writing pointer, processing continues to block 1030. Alternatively, if at block 1010 it is time to clear the row, writing pointer processing continues to block 1020. At block 1020, the row writing pointer is set, reset, or initialized to 0, such as to point to a row reference data location for block Y0 of MB0 equal to 0 of row reference buffer 820 of FIG. 8B.

Next, at block 1030, the column buffer writing pointer is derived from the row buffer writing pointer as described above with respect to equation (a), or equation (b) where REF_SZ=8. Thus, in equation (a), (4* REF_SZ−1) is =0x1 F. Likewise, in equation (b), (4* REF_SZ) is equal to 0x20. Thus, in block 1030, the logical AND of 0x1 F (e.g., 31 in binary) may cause Pwc to go to or reset to 0 when it reaches 32. Similarly, where equation (b), 0x20 may cause the modular to set a base or residue of 32 to perform the same functionality as equation (a) with respect to Pwc. For example, initially, the column buffer writing pointer is derived to point to a column reference data location for block Y0 of MB0 equal to 0 of column reference buffer 880 of FIG. 8B.

At block 1040 the row buffer reading pointer or pointers are derived from the row buffer writing pointer. This process may be performed as known in the art, as described above. At block 1050 the column buffer reading pointers are derived from the column buffer write pointers, such as is described above for equations (d) and (e).

At block 1060 the row buffer writing pointer is incremented by 8. Block 1060 may correspond to descriptions above with respect to incrementing row buffer writing pointers for buffer 820 of FIG. 8B. It can be appreciated that for processing of samples according to other standards, such as standards where more or less than 8 samples of reference data are stored for column and/or row reference data, a number other than 8 may be used to increment at block 1060 and other values may be used at block 1030 such as described, with respect to equations (a) through (c). For example, at block 1060 the row buffer writing pointer may be incremented by two, four, six, ten, twelve, sixteen, 20, 24, 32, 64, 128, 256, 512, 1024, 2048, or a combination thereof.

At block 1070 it is determined whether the four blocks of a macro block have been processed. For example, block 1070 may correspond to determining whether the four Y blocks of a macro block, or the single block of a Cb or Cr block of a macro block have been processed according to a write pointer (e.g., such as a row and/or column buffer write pointer. It can be appreciated that for processing other samples or according to other standards, block 1070 may not be considered, such as in the case where process 1000 applies to processing 8×8 blocks of Cb or Cr samples. Likewise, at block 1070 it may be determined where a number of blocks, other than four, have been processed, such as for a structure having other than four blocks in a macro block. If at block 1070 four blocks of a macro block have not been processed, processing returns to block 1030.

If at block 1070 four blocks of a macro block have been processed, processing continues to block 1072. At block 1072 it is determined whether all of the macro blocks in a macro block row have been processed. For example, block 1072 may correspond to determining whether all of the blocks in a row of blocks 130, row 612, or a row as shown in FIG. 8B have been processed. If at block 1072 all the macro blocks in the row have not been processed, processing returns to block 1030 to processing next macro block of that row (e.g., see block 1070).

If at block 1072 all macro blocks in the row of macro blocks have been processed, processing continues to block 1074. At block 1074 it is determined whether all macro block rows in a frame have been processed. For example, block 1074 may correspond to determining whether all of block 1030 were all blocks of a frame of data, such as frame of data 120 as shown in FIG. 1 have been processed. If at block 1074 all macro blocks of the frame have not been processed, processing continues to block 1076 where the next macro block row is to be processed. After block 1076, processing returns to block 1010. For example, block 1076 may correspond to going from row 0-132 to row 1-133 of blocks 130 as shown in FIG. 1. Block 1076 may correspond to writing reference data (e.g., row and column reference data into buffers 820 and 880 of FIG. 8B) to locations for a block or a row of reference data locations. If at block 1074 all the macro block rows in a frame have been processed or exhausted, processing continues to block 1080 where processing ends.

Figure 11:
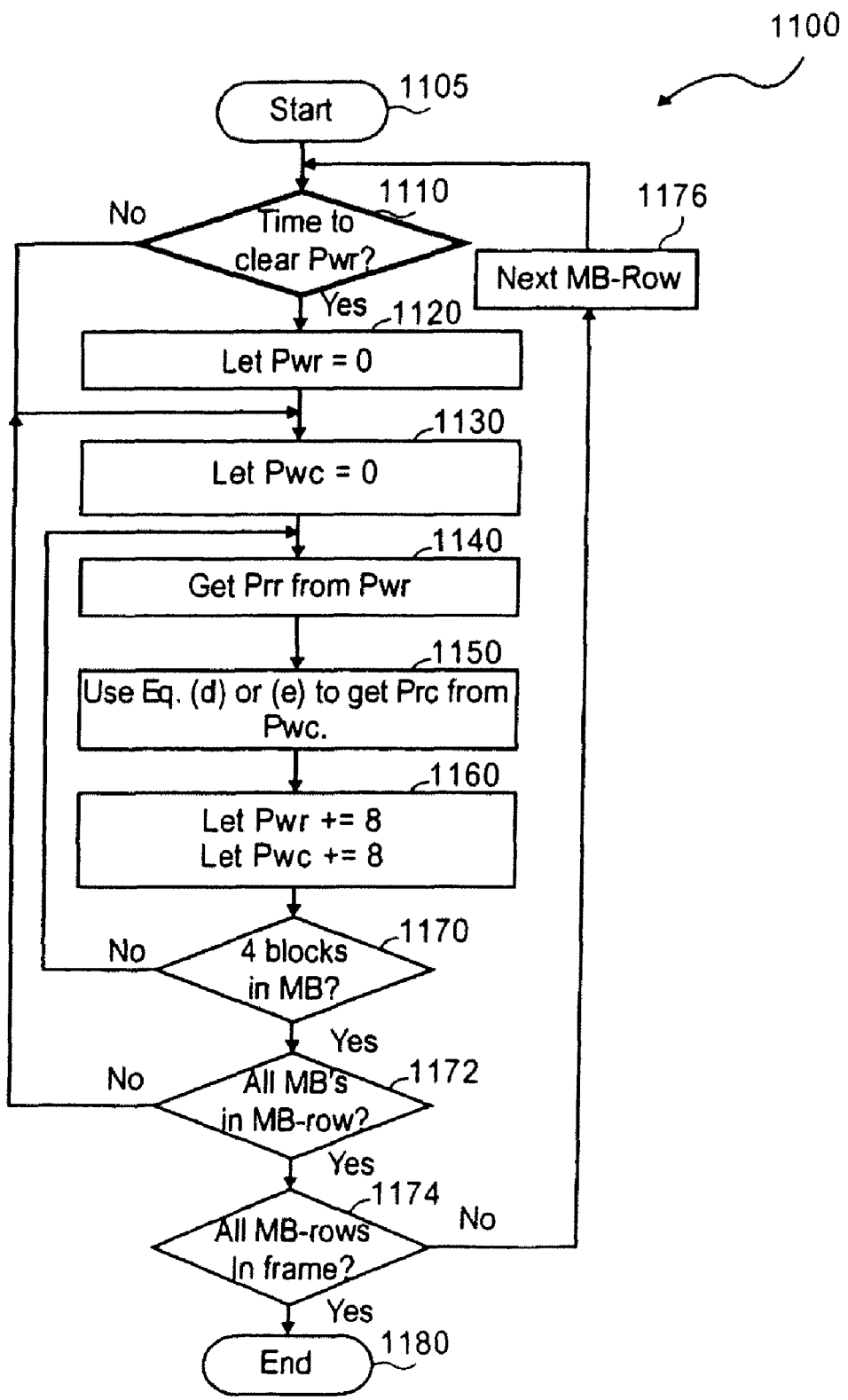
FIG. 11 is a flow diagram of a process for calculating write and read pointers for two rows of Y components.

Similarly, FIG. 11 is a flow diagram of a process for calculating write and read pointers for two rows of Y components. FIG. 11 shows process 1100, such as a process for generating, selecting, calculating, or pointing a column read pointer and a row read pointer to point to a column reference data location and a row reference data location of a column reference data buffer and a row reference data buffer by accounting for considering or using a column write pointer or row write pointer that also points to a column or row reference data location of the column of row reference data buffer. For example, process 1100 may also create pointers or row buffer write pointer (Pwr), row buffer read pointer (Prr), column buffer write pointer (Pwc), and column buffer read pointer (Prc).

At block 1105, process 1100 begins. At block 1110, it is determined whether it is time to clear the row write pointer or the writing pointer to row references or reference data. If at block 1110 it is not time to clear the row writing pointer, processing continues to block 1130. Alternatively, if at block 1110 it is time to clear the row, writing pointer processing continues to block 1120. At block 1120, the row writing pointer is set, reset, or initialized to 0, such as to point to a row reference data location for block Y0 of MB0 equal to 0 of row reference buffer 820 of FIG. 8B.

Next, at block 1130, the column buffer writing pointer is set, reset, or initialized to 0, such as to point to a column reference data location for block Y0 of MB0 equal to 0 of column reference buffer 880 of FIG. 8B. At block 1140 the row buffer reading pointer or pointers are derived from the row buffer writing pointer. This process may be performed as known in the art, as described above. At block 1150 the column buffer reading pointers are derived from the column buffer write pointers, such as is described above for equations (d) and (e).

At block 1160 the row buffer writing pointer is incremented by 8, and the column buffer writing pointer is incremented by 8. Block 1160 may correspond to descriptions above with respect to incrementing row buffer writing pointers for buffer 820, and column buffer writing pointers for buffer 820 of FIG. 8B. For instance, blocks 1130 and 1160 may combine to teach resetting or initializing the row and column buffer write pointers to 0 (e.g., to point to Y0 of MB0) and then increasing the row and column buffer write pointers by a size of stored row and column reference data for a block, for the next block and iterations thereafter (e.g., by a reference size of 8 samples, or 8) such as to implement equation (c) above.

It can be appreciated that for processing of samples according to other standards, such as standards where more or less than 8 samples of reference data are stored for column and/or row reference data, a number other than 8 may be used to increment at block 1160 and other values may be used at block 1130 such as described, with respect to equations (a) through (c). For example, at block 1160 the row buffer writing pointer may be incremented by two, four, six, ten, twelve, sixteen, 20, 24, 32, 64, 128, 256, 512, 1124, 2048, or a combination thereof.

At block 1170 it is determined whether the four blocks of a macro block have been processed, such as described above for block 1070. If at block 1170 four blocks of a macro block have not been processed, processing returns to block 1140.

If at block 1170 four blocks of a macro block have been processed, processing continues to block 1172. At block 1172 it is determined whether all of the macro blocks in a macro block row have been processed, such as described above for block 1072. If at block 1172 all the macro blocks in the row have not been processed, processing returns to block 1130 to processing next macro block of that row (e.g., see block 1170).

If at block 1172 all macro blocks in the row of macro blocks have been processed, processing continues to block 1174. At block 1174 it is determined whether all macro block rows in a frame have been processed, such as described above for block 1074. If at block 1174 all macro blocks of the frame have not been processed, processing continues to block 1176 where the next macro block row is to be processed, such as described above for block 1076. After block 1176, processing returns to block 1110. If at block 1174 all the macro block rows in a frame have been processed or exhausted, processing continues to block 1180 where processing ends.

Blocks 1010 and 1040 of process 1000 may depend on buffer architecture. Similarly, blocks 1110 and 1140 of process 1100 may depend on buffer architecture. Also, processing or functionality to perform blocks 1010 and 1110 may be known in the art for performing prediction direction determination and intra prediction. Likewise, processing and functionality to perform blocks 1040 and 1140 may be known in the art for performing intra-prediction to perform direction determination and intra-prediction. For example, different buffer architectures provide different times or points in the time domain or process sequence at which to clear the row buffer write pointer, as well as different ways to derive the row buffer reading pointers from the row buffer write pointer. In some cases, the 2-MB-row rotation architecture resets the Pwr every two MB rows while the two-block-row rotation buffer clears the Pwr every MB row.

Moreover, the process described above with respect to FIGS. 10-11 may be applied to the Cr and Cb reference data read pointers. Specifically, process 1000 and 1100 may be modified by removing block 1070 and 1170 from the processes and modifying equations in 1030 to Pwc=Pwr & 0x07 or Pwc=Pwr % 0x08. Additionally, it can be appreciated that the concepts described above with respect to buffer 820 and 880 and write and read pointers therefore of FIGS. 8-11 can be expanded to other adjacent or abutting locations including or not including those identified in template 360 of FIG. 5. For instance, as noted, offsets may be considered for optional location ALRA.

It is also considered that reference data locations that are not adjacent or abutted to current location CL, such as locations previously separated from location CL by one or more locations of reference data, may be considered and buffer 820 and 880 and write and read pointers therefore may be generated appropriately according to the concepts described herein. Thus, the reference data at adjacent or abutting locations to the write pointer or current block being processed may be skipped and locations farther out may be considered.

In addition, the concepts described above with respect to buffer 820 and 880 and write and read pointers therefore may be applied to frames of data or blocks of data having more or less macro blocks than 4 macro blocks (e.g., more or less macro blocks than the rows shown for blocks 130 of FIG. 1). Likewise, the concepts can be applied to reference data formats storing more or less than 8 samples of column and row reference data, such as where reference data is stored for more or less than one column and one row of samples.

For example, the concept can be applied where the column and/or row size of a block is greater than or less than 8 samples; and/or where more or less than one column and/or one row of data is stored as reference data. Similarly, the concept can be applied for various other video processing standards that use color components other than Cb and Cr; in addition to Cb and/or Cr, that use other luminance components than Y components, that use luminance components in addition to or less than Y0, Y1, Y2, and Y3; and that use structures other than macro blocks. For example, the concept may be applied where the luminance samples are also 8×8 blocks corresponding to each 8×8 Cb and Cr component.

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. A method comprising:
completing one of prediction direction determination and intra prediction coding for a current block of a digital video frame, wherein completing comprises:
storing a plurality of a type of reference data samples from a plurality of blocks of no more than two macro blocks of the digital video frame in a plurality of reference data locations of a computer memory, during completing, wherein the reference data locations comprise at least two column reference data locations, and further comprising:
storing a plurality of samples from the plurality of blocks in each of a plurality of row reference data locations, wherein the row reference data locations comprise locations for at least two macro-blocks in the frame;
pointing a column write pointer to a column reference data location corresponding to a current location of the plurality of blocks;
pointing a row write pointer to a row reference data location corresponding to the current location;
pointing a column read pointer to a location to a left of the column write pointer in the column reference data locations; and
pointing a plurality of row read pointers to locations of at least two of a left and above, above, and a right and above the row write pointer in the row reference data locations.

2. The method of claim 1, wherein the no more than two macro-blocks include samples from one of not more than two blocks of chrominance samples and not more than four blocks of luminance samples.

3. The method of claim 1, wherein the no more than two macro-blocks include a sample size of no more than one macro block of luminance column reference data samples; and
further comprising storing two blocks of chrominance column reference data samples of the digital video frame in a plurality of reference data locations, during completing.

4. The method of claim 3, wherein the macro block of luminance column reference data samples arc equal to a number of luminance blocks of one macro block multiplied by a number of luminance data samples in one column of each of the luminance blocks, and the two blocks of chrominance column reference data samples are equal to a number of chrominance data samples in one column of one chrominance block of Cr and in one column of one chrominance block of Cb.

5. The method of claim 1, wherein the type of reference data samples are column reference data samples, and further comprising:
performing one of prediction direction determination and intraprediction coding for the current block, prior to completing;
selecting a current location from the plurality of blocks;
selecting a reference data location to a left of the current location.

6. The method of claim 1, further comprising:
incrementing the column write pointer and a row write pointer by a number equal to the number of samples of reference data from one block;
resetting the column write pointer after the samples have been pointed to by the column write pointer for the up to one macro-block in the frame.

7. A method comprising:
one of selecting a direction for intra-prediction direction determination and producing code for intra-prediction coding of a current block of a digital video frame, wherein selecting or completing comprises:
selecting a current location from a plurality of reference data locations of the digital video frame, wherein the reference data locations include one of an even row of macro block locations and an odd row of macro block locations for column reference data; and
storing in a computer memory, column reference data for no more than two of the even row of locations during selecting or producing when the current location is in the even row, and no more than two of the odd row of locations during selecting or producing when the current location is in the odd row, wherein the reference data locations comprise at least two column reference data locations, and further comprising:
storing a plurality of samples from a plurality of blocks in each of a plurality of row reference data locations, wherein the row reference data locations comprise locations for at least two macro-blocks in the frame;
pointing a column write pointer to a column reference data location corresponding to a current location of the plurality of blocks;
pointing a row write pointer to a row reference data location corresponding to the current location;
pointing a column read pointer to a location to a left of he column write pointer in the column reference data locations; and
pointing a plurality of row read pointers to locations of at least two of a left and above, above, and a right and above the row write pointer in the row reference data locations.

8. The method of claim 7, wherein the reference data locations include an even row of macro block locations and an odd row of macro block locations for row reference data; and further comprising:
selecting row reference data from the even row of locations when the current location is in the odd row, or from the odd row of locations when the current location is in the even row.

9. The method of claim 8, wherein selecting column reference data comprises selecting column data from a location to a left of the current location, and wherein selecting row reference data comprises selecting row data from a location of at least one of to a left and above, above, and to a right and above the current location.

10. The method of claim 8, further comprising completing direction determination and intra-prediction coding using samples stored in buffers corresponding to the selected row reference data and the selected column reference data.

11. The method of claim 10, where completing direction determination and intra-prediction coding includes comparing the samples stored in buffers corresponding to the selected row reference data and the selected column reference data with a plurality of reference data samples corresponding to the current location.

* * * * *